(12) United States Patent
Maidanchuk et al.

(10) Patent No.: US 12,379,789 B2
(45) Date of Patent: Aug. 5, 2025

(54) SMART PEN AND DISPLAY DEVICE USING THE SAME

(71) Applicant: Samsung Display Co., LTD., Yongin-si (KR)

(72) Inventors: Ivan Maidanchuk, Hwaseong-si (KR); Chang Min Park, Gwangmyeong-si (KR); Kyu Shik Shin, Hwaseong-si (KR); Jin Yong Sim, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/966,651

(22) Filed: Oct. 14, 2022

(65) Prior Publication Data

US 2023/0229247 A1 Jul. 20, 2023

(30) Foreign Application Priority Data

Jan. 18, 2022 (KR) ........................ 10-2022-0006953

(51) Int. Cl.
| | |
|---|---|
| *G06F 3/0354* | (2013.01) |
| *G06F 3/03* | (2006.01) |
| *G06F 3/038* | (2013.01) |
| *G06F 3/044* | (2006.01) |

(52) U.S. Cl.
CPC ........ *G06F 3/03542* (2013.01); *G06F 3/0317* (2013.01); *G06F 3/0386* (2013.01); *G06F 3/044* (2013.01)

(58) Field of Classification Search
CPC ............ G06F 3/03545; G06F 3/03542; G06F 3/0317; G06F 3/0386
See application file for complete search history.

(56) References Cited

U.S. PATENT DOCUMENTS

| | | | |
|---|---|---|---|
| 6,548,768 B1 | 4/2003 | Pettersson et al. | |
| 7,180,509 B2 | 2/2007 | Fermgård et al. | |
| 7,588,191 B2 | 9/2009 | Pettersson et al. | |
| 9,378,444 B2 | 6/2016 | Knee et al. | |
| 2010/0157383 A1* | 6/2010 | Ichikawa ............... | G06F 3/0321 358/473 |
| 2012/0249490 A1 | 10/2012 | Lee et al. | |
| 2013/0321357 A1 | 12/2013 | Yamada et al. | |
| 2020/0225772 A1* | 7/2020 | Koike ................. | G06F 3/03545 |
| 2023/0083248 A1 | 3/2023 | Park et al. | |

FOREIGN PATENT DOCUMENTS

| | | |
|---|---|---|
| CN | 1804770 A | 7/2006 |
| JP | 2000199869 * | 7/2000 |
| JP | 2004-102588 A | 4/2004 |
| JP | 2006-195928 A | 7/2006 |

(Continued)

*Primary Examiner* — Matthew A Eason
*Assistant Examiner* — Scott D Au
(74) *Attorney, Agent, or Firm* — Womble Bond Dickinson (US) LLP

(57) ABSTRACT

A smart pen includes a body, a pen tip portion at an end of the body, and including a pen tip extending in a first direction, a pen tip support configured to support the pen tip, and a reflector on one surface of the pen tip support, and having a curvature, and a light emitter supported by the body, configured to emit light, and inclined at an angle with respect to the first direction.

20 Claims, 29 Drawing Sheets

(56) References Cited

FOREIGN PATENT DOCUMENTS

| | | | |
|---|---|---|---|
| JP | 2006-252503 A | | 9/2006 |
| JP | 2009181512 | * | 8/2009 |
| JP | 2010-026693 A | | 2/2010 |
| KR | 10-2047021 B1 | | 11/2019 |
| KR | 10-2023-0041111 A | | 3/2023 |
| WO | WO 2019160389 | * | 8/2019 |

* cited by examiner

FIG. 25

|  | Col1 | Col2 | Col3 | Col4 | Col5 | Col6 |
|---|---|---|---|---|---|---|
| Row1 | 00 | 01 | 01 | 11 | 10 | 11 |
| Row2 | 00 | 01 | Null | 10 | 00 | 10 |
| Row3 | 01 | 01 | 01 | 01 | Null | 10 |
| Row4 | 01 | 10 | 00 | 00 | 01 | 11 |
| Row5 | 01 | 01 | 00 | 10 | 01 | 11 |
| Row6 | 01 | 10 | 11 | 11 | 11 | 01 |

| | | | | |
|---|---|---|---|---|
| Data 1 | RP1 | 01 | 10 | ----- Row1 |
| | 01 | 00 | 11 | ----- Row2 |
| Data 2 | RP2 | 11 | 01 | ----- Row3 |
| | 01 | 00 | 10 | ----- Row4 |
| | Col1 | Col2 | Col3 | |

RP: RP1, RP2

SMART PEN AND DISPLAY DEVICE USING THE SAME

CROSS-REFERENCE TO RELATED APPLICATION

This application claims priority to, and the benefit of, Korean Patent Application No. 10-2022-0006953 filed on Jan. 18, 2022 in the Korean Intellectual Property Office, the contents of which in its entirety are herein incorporated by reference.

BACKGROUND

1. Field

The present disclosure relates to a smart pen, and to a display device using the same.

2. Description of the Related Art

With the advance of information-oriented society, more and more demands are placed on display devices for displaying images in various ways. For example, display devices are employed in various electronic devices, such as smartphones, digital cameras, laptop computers, navigation devices, and smart televisions. The display device may be a flat panel display device, such as a liquid crystal display device, a field emission display device and an organic light emitting display device.

A recent display device supports a touch input using a user's body part (e.g., a finger) and a touch input using an electronic pen. The touch input using the electronic pen allows the display device to detect the touch input more sensitively than the touch input using only a part of a user's body.

SUMMARY

Aspects of the present disclosure provide a smart pen and a display device using the same capable of increasing a recognition rate of a code pattern unit (e.g., code pattern) and code information of a display panel by adjusting an inclination angle of a light-emitting unit (e.g., a light emitter) and widening a light-receiving range of light that a light-receiving unit (e.g., a light receiver) receives according to an inclination angle of the smart pen.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to one or more embodiments of the present disclosure, a smart pen includes a body, a pen tip portion at an end of the body, and including a pen tip extending in a first direction, a pen tip support configured to support the pen tip, and a reflector on one surface of the pen tip support, and having a curvature, and a light emitter supported by the body, configured to emit light, and inclined at an angle with respect to the first direction.

A radius of curvature forming the curvature may be about 70 mm to about 100 mm.

The angle may be within a range of about 15 degrees to about 20 degrees.

The pen tip support may define a receiving hole in which the pen tip is accommodated.

The pen tip support may include a first pen tip support surrounding a portion of a side surface of the pen tip, and a second pen tip support surrounding a remaining portion of the side surface of the pen tip.

The receiving hole may be defined as a space between the first pen tip support and the second pen tip support.

The second pen tip support may include a first surface in contact with the pen tip, and a second surface opposite to the first surface, and in contact with the reflector.

The second surface of the second pen tip support may have the curvature.

The body may include a first support, and a second support configured to support the light emitter, and fixed to the first support.

The second support may include a light emitter support portion having a first support surface supporting a surface of the light emitter, and a second support surface supporting another surface of the light emitter, a first fixing portion extending from a first end of the light emitter support portion in the first direction, and overlapping the first support in a second direction that is orthogonal to the first direction, and a second fixing portion extending in the first direction from a second end of the light emitter support portion, and overlapping the second support in the second direction.

The smart pen may further include a light emitting circuit board between the light emitter and the second support surface, and electrically connected to the light emitter.

The smart pen may further include a light receiver inside the first support, and configured to receive light from the body.

The smart pen may further include a light-transmitting layer between the pen tip support and the first support, and configured to transmit infrared light.

A distance between the light receiver and the light-transmitting layer may be greater than a distance between the light emitter and the light-transmitting layer.

The light emitter may be configured to emit infrared light.

The reflector may contain an infrared reflective material.

The reflector may be formed in a shape having the curvature.

According to one or more other embodiments of the present disclosure, a smart pen includes a body including a first support, and a second support connected to the first support, a light emitter supported by the second support, and configured to emit light, and a pen tip portion including a pen tip extending in a first direction, and a pen tip support configured to support the pen tip, wherein the second support includes a light emitter support portion having a first support surface supporting a first surface of the light emitter, and a second support surface supporting a second surface of the light emitter, a first fixing portion extending from a first end of the light emitter support portion in the first direction, and overlapping the first support in a second direction that is orthogonal to the first direction, and a second fixing portion extending in the first direction from a second end of the light emitter support portion, and overlapping the second support in the second direction.

The second support surface may be inclined at an angle with respect to the first direction.

The angle may be within a range of about 15 degrees to about 20 degrees.

BRIEF DESCRIPTION OF THE DRAWINGS

The above and other aspects of the present disclosure will become more apparent by describing in detail embodiments thereof with reference to the attached drawings, in which:

FIG. 25 is a diagram illustrating data codes corresponding to the code pattern of FIG. 24;

FIG. 27 is a diagram illustrating data codes corresponding to the code pattern of FIG. 26;

FIG. 29 is a diagram illustrating data codes corresponding to the code pattern of FIG. 28.

DETAILED DESCRIPTION

Figure 1:
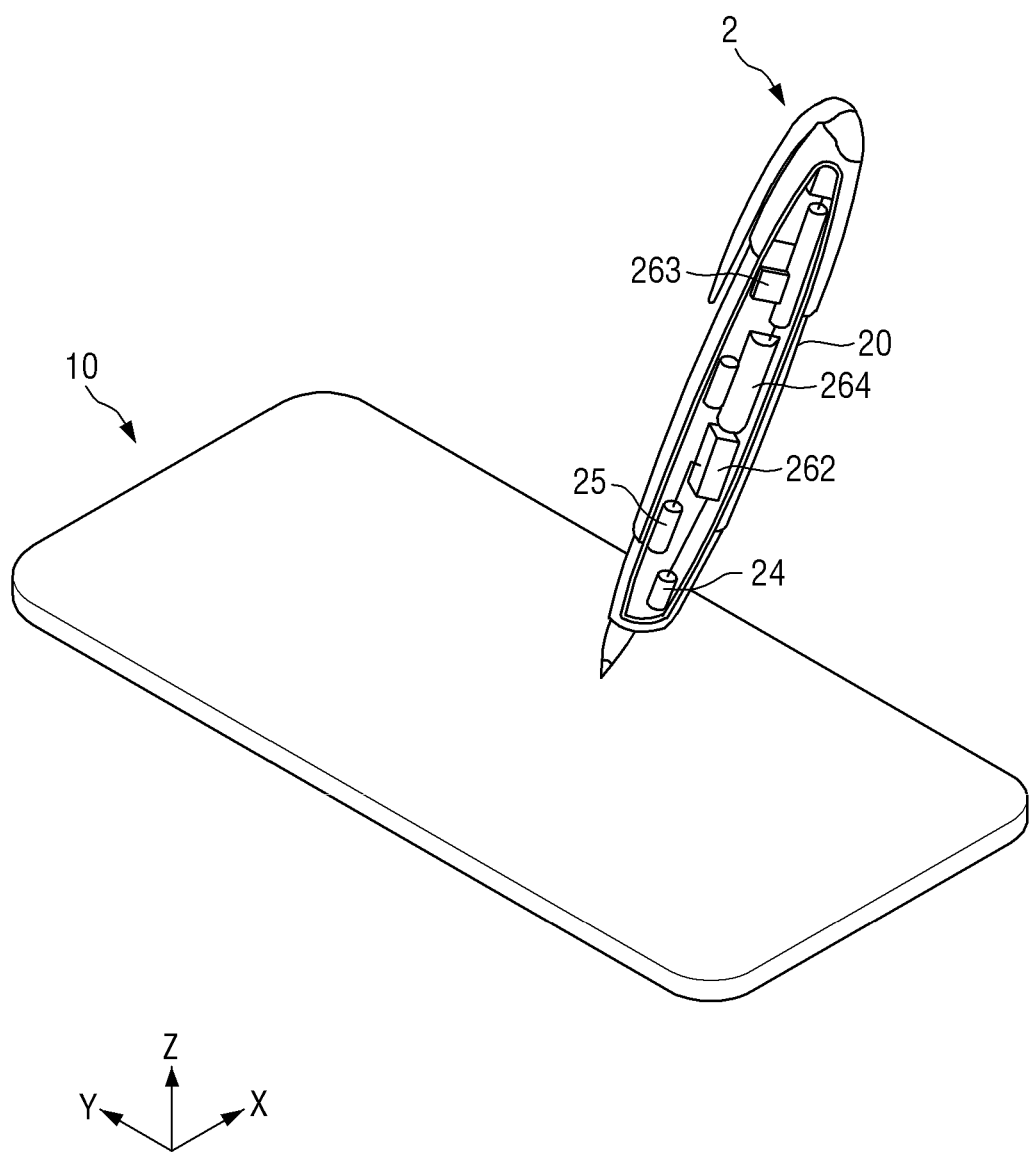
FIG. 1 is a configuration view illustrating a smart pen and a display device according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, "or" generally means "and/or," and the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
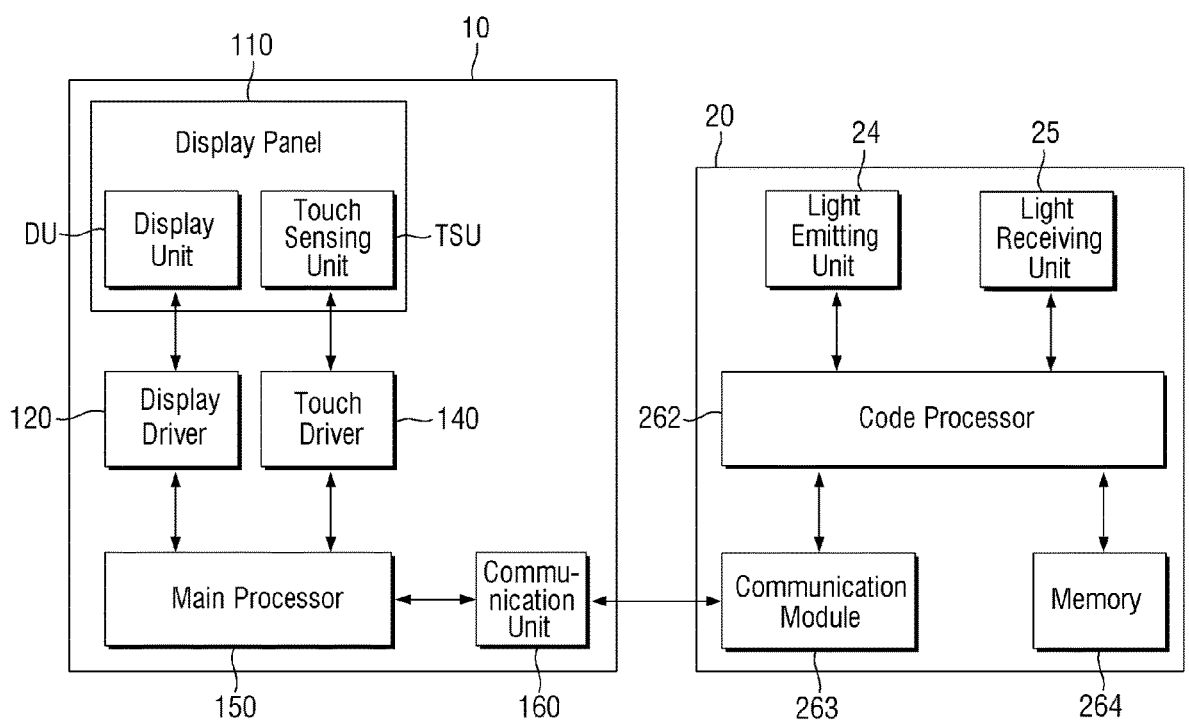
FIG. 2 is a configuration block diagram illustrating the smart pen and the display device according to one or more embodiments.

FIG. 1 is a configuration view illustrating a smart pen and a display device according to one or more embodiments. FIG. 2 is a configuration block diagram illustrating the smart pen and the display device according to one or more embodiments.

Referring to FIGS. 1 and 2, a display device 10 according to one or more embodiments includes a display panel 110, a display driver 120, a touch driver 140, a main processor 150, and a communication unit (e.g., a communicator) 160.

The display device 10 uses a smart pen 2 as a touch input device. The smart pen 2 may be an electronic pen that senses display light of the display panel 110 or that senses light reflected from the display panel 110 using an optical method, and may detect code patterns included in the display panel 110 and may generate coordinate data based on the sensed light.

The display panel 110 may include a display unit (e.g., a display) DU for displaying an image, and a touch sensing unit (e.g., a touch sensor) TSU for sensing a body part, such as a finger and the smart pen 2. The display DU may include a plurality of pixels and may display an image through the plurality of pixels. The display DU may also display an image including code patterns through a plurality of pixels.

The touch sensor TSU may include a plurality of touch electrodes to sense a user's touch in a capacitive manner. Here, at least some touch electrodes among the plurality of touch electrodes may also include a code pattern unit (e.g., code pattern) CDP of FIG. 22 to sense the touch of the smart pen 2.

Figure 22:
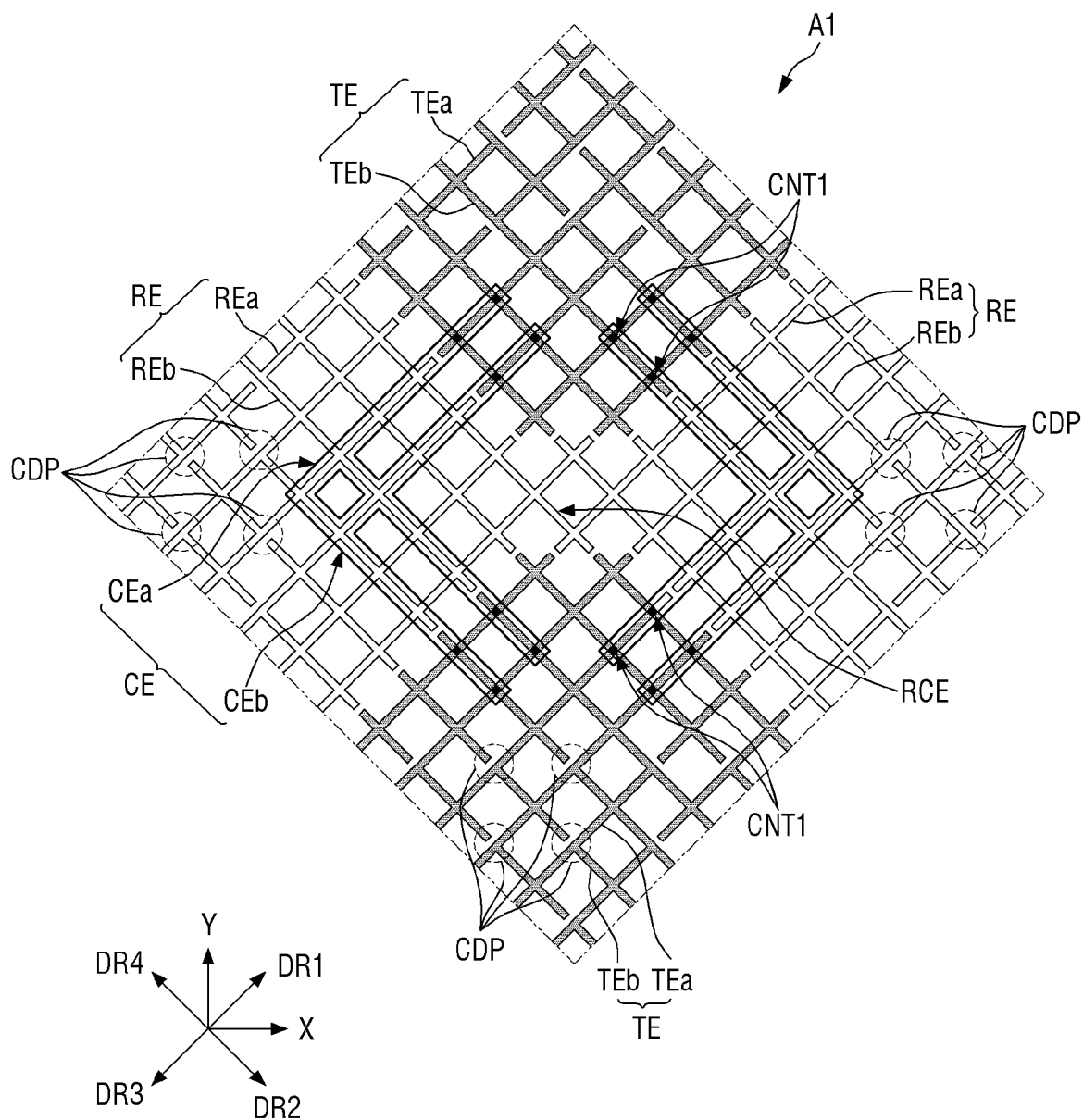
FIG. 22 is an enlarged view of area A1 shown in FIG. 21.

The code pattern CDP of FIG. 22 of the display panel 110 may include code patterns that are cut according to a corresponding criterion to form a corresponding code for position information. The code patterns may correspond to a value of a preset data code. Detailed configuration features of the touch sensor TSU including the display panel 110, the code pattern CDP of FIG. 22, and detailed structures of the code patterns will be described later in more detail with reference to the accompanying drawings.

The display driver 120 may output signals and voltages for driving the display DU. The display driver 120 may supply data voltages to data lines. The display driver 120 may supply a power voltage to the power line, and may supply gate control signals to the gate driver.

The touch driver 140 may be connected to the touch sensor TSU. The touch driver 140 may supply a touch-driving signal to a plurality of touch electrodes of the touch sensor TSU, and may sense an amount of change in capacitance between the plurality of touch electrodes. The touch driver 140 may calculate whether a user's touch is inputted and may calculate touch coordinates based on an amount of change in capacitance between the plurality of touch electrodes.

The main processor 150 may control all functions of the display device 10. For example, the main processor 150 may supply digital video data to the display driver 120 such that the display panel 110 displays an image. For example, the main processor 150 may receive touch data from the touch driver 140 to determine a user's touch coordinates, and then may generate digital video data according to the touch coordinates, or may execute an application indicated by an icon displayed on the user's touch coordinates. As another example, the main processor 150 may receive coordinate data from the smart pen 2 to determine touch coordinates of the smart pen 2, and then may generate digital video data according to the touch coordinates or may execute an application indicated by an icon displayed on the touch coordinates of the smart pen 2.

The communicator 160 may perform wired/wireless communication with an external device. For example, the communicator 160 may transmit/receive a communication signal to/from a communication module (e.g., communicator) 263 of the smart pen 2. The communicator 160 may receive coordinate data composed of data codes from the smart pen 2, and may provide the coordinate data to the main processor 150.

Figure 3:
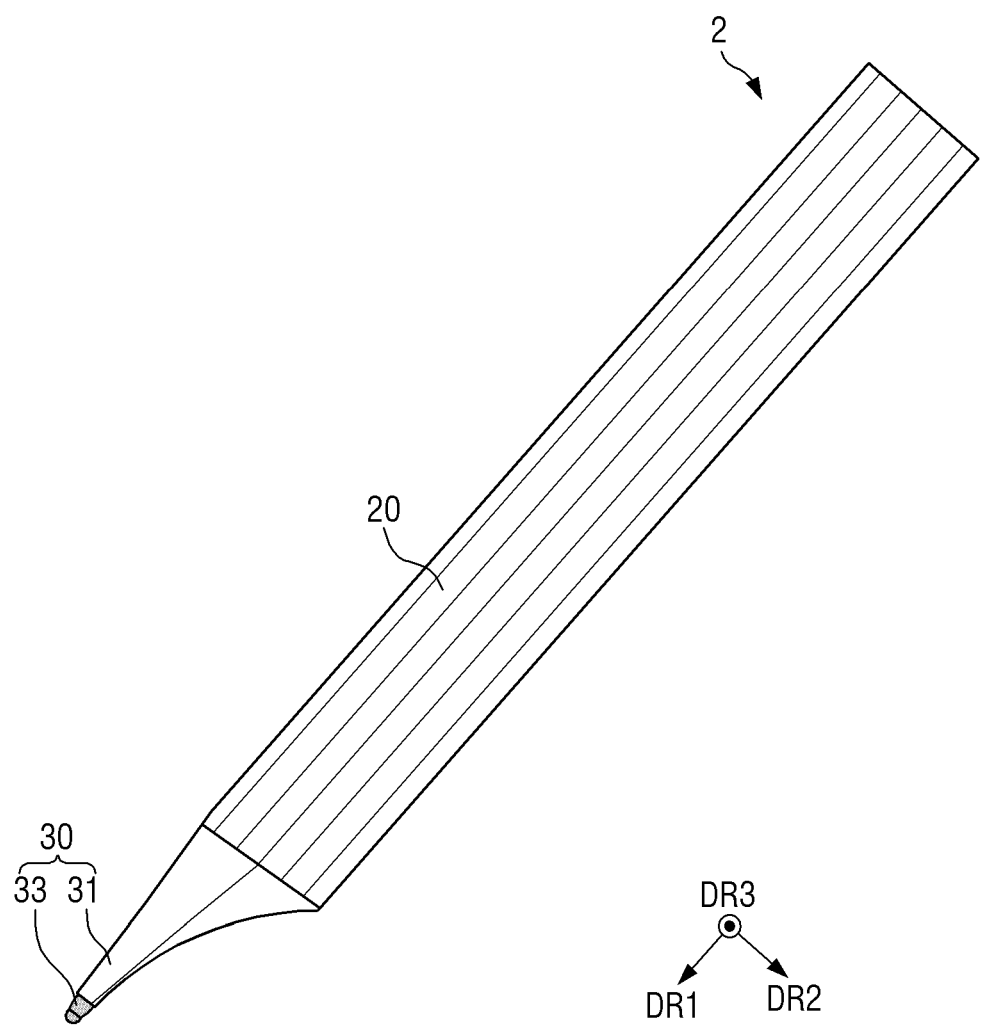
FIG. 3 is a side view illustrating a smart pen according to one or more embodiments.

The smart pen 2 according to one or more embodiments includes a body unit (e.g., a body) 20 and a pen tip portion 30 (e.g., see FIG. 3). The smart pen 2 may be formed in the shape of a writing instrument, such as a fountain pen, through the body 20 and the pen tip portion 30 constituting the overall appearance, but the embodiments of the specification are not limited thereto. That is, the smart pen 2 may not be limited to a simple writing instrument shape or structure.

Figure 10:
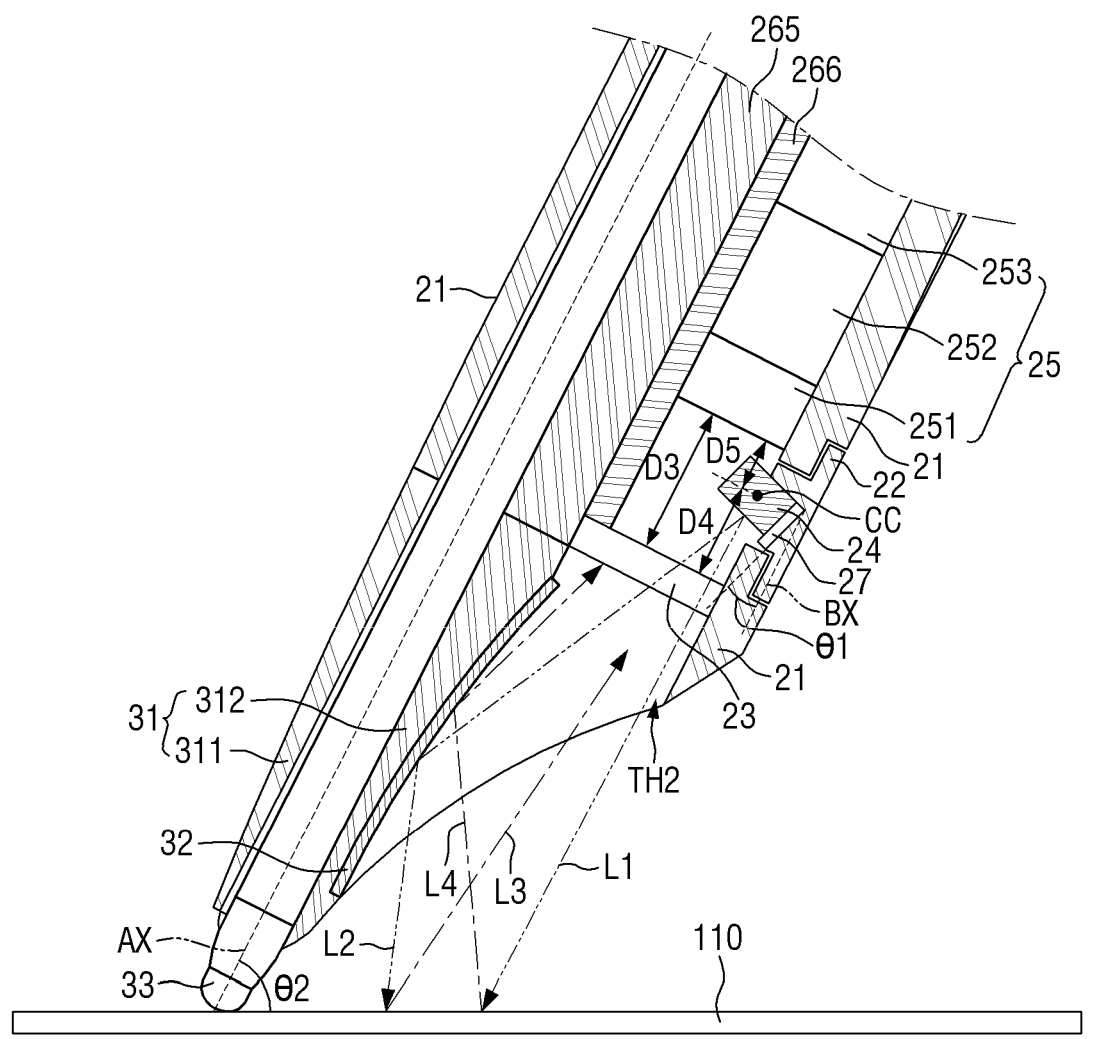
FIG. 10 is a side cross-sectional view illustrating a structure of a smart pen according to one or more embodiments.
Figure 10:
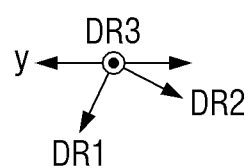

The body 20 of the smart pen 2 includes support portions 21 and 22 (e.g., see FIG. 4), a light emitter 24, a light receiver 25, a light-transmitting layer 23 (e.g., see FIG. 11), and a controller 26 (e.g., see FIG. 10).

The light emitter 24 may be located on the body 20 at a position adjacent to the pen tip portion of the smart pen 2. The light emitter 24 may emit light in one direction. For example, the light emitter 24 may emit infrared light from one end of the body 20 in one direction of the pen tip portion 30 using at least one infrared light source. At least one infrared light source module included in the light emitter 24 may be configured as an infrared LED array having a matrix structure.

The light receiver 25 is located on the body 20 at a position adjacent to the pen tip portion of the smart pen 2, and senses the image signal for the code pattern CDP (e.g., see FIG. 22) included in the display panel 110 of the display device 10. For example, the light receiver 25 may detect infrared light reflected from the code patterns of the code pattern CDP with an infrared camera.

The light receiver 25 may include a lens system 251, a barrel unit (e.g., a barrel) 252, and an image sensor 253 (e.g., see FIG. 10).

The lens system 251 may focus infrared rays and may transmit an infrared image to the barrel 252. The barrel 252 may provide a space for transmitting the focused infrared image from the lens system 251 to the image sensor 253. In addition, the infrared image may be focused so that the image sensor 253 may recognize it. The optical image sensor 253 may convert the optical image formed by the lens system 251 into an electrical image signal and may output the signal.

The image sensor 253 may be configured in a matrix-structured array, like the infrared LED array, and may provide image data of the code patterns to a code processor 262 according to the infrared shape reflected from the code patterns of the code pattern. In this way, the light receiver 25 of the smart pen 2 may continuously detect the code patterns included in at least some areas of the touch sensor TSU according to the user's control and movement, and may continuously generate the shape data of the code patterns to provide the shape date to the code processor 262.

The light-transmitting layer 23 may be located on one side of the light receiver 25 and the light emitter 24. The light-transmitting layer 23 may block wavelength bands other than infrared rays and may allow infrared rays to pass therethrough. A detailed description of the light-transmitting layer 23, the light receiver 25, and the light emitter 24 will be described later with reference to FIGS. 10 to 14.

The controller 26 includes the code processor 262, the communicator 263, and a memory 264.

The code processor 262 may determine a time at which the pressure-sensing signal is inputted as the time at which the smart pen 2 is used. When a pressure-sensing signal is inputted, the code processor 262 may continuously receive image data of the code pattern from the light receiver 25. For example, the code processor 262 may continuously receive image data for the code patterns included in the code pattern, and may identify the structure and shape of the code patterns. The code processor 262 may extract or generate data codes corresponding to the structures and shapes of the code patterns, and may extract or generate coordinate data corresponding to the combined data codes by combining the data codes. The code processor 262 may transmit the generated coordinate data to the display device 10 through the communicator 263. For example, the code processor 262 may receive the image data of the code pattern and may generate and convert data codes respectively corresponding to the code patterns, so that coordinate data may be suitably generated without complicated computation and correction.

The communicator 263 may perform wired or wireless communication with an external device. For example, the communicator 263 may transmit/receive a communication signal to/from the communicator 160 of the display device 10. The communicator 263 may receive coordinate data composed of data codes from the code processor 262, and may provide the coordinate data to the communicator 160.

The memory 264 may store data suitable for driving the smart pen 2. The memory 264 stores image data of the code patterns, and the code patterns respectively corresponding to each of the image data and the data codes. In addition, the memory 264 stores data codes and coordinate data according to a combination of data codes. The memory 264 shares the data codes respectively corresponding to each of the image data and the code patterns, and the coordinate data according to a combination of the data codes with the code processor 262. Accordingly, the code processor 262 may combine the data codes using the data codes and the coordinate data stored in the memory 264, and may extract or generate coordinate data corresponding to the combined data code.

Hereinafter, the overall appearance of the smart pen 2 will be described with reference to FIGS. 3 to 8.

Figure 4:
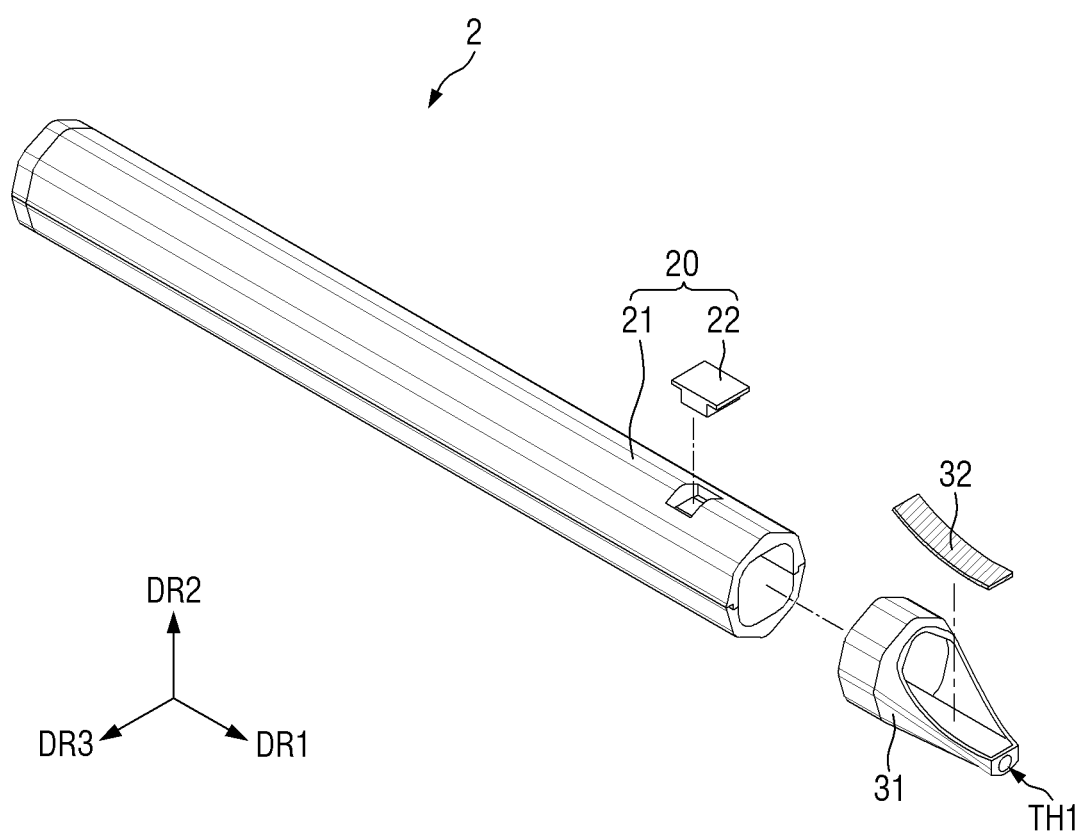
FIG. 4 is an exploded perspective view of a smart pen according to one or more embodiments.
Figure 5:
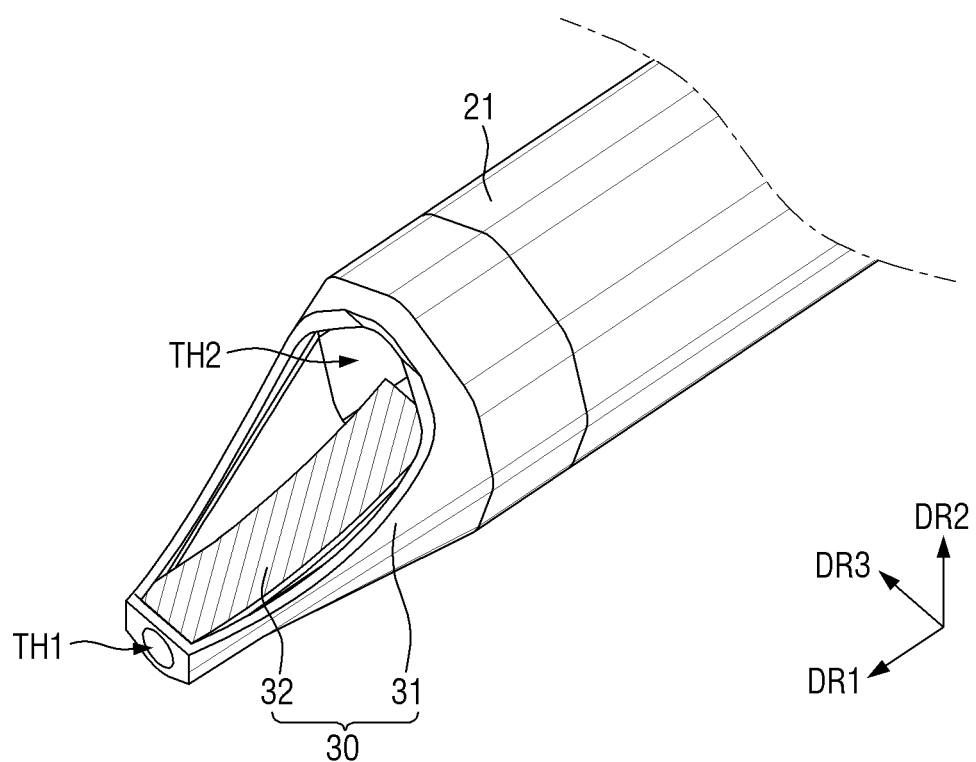
FIG. 5 is a perspective view illustrating a pen tip portion of a smart pen according to one or more embodiments.
Figure 6:
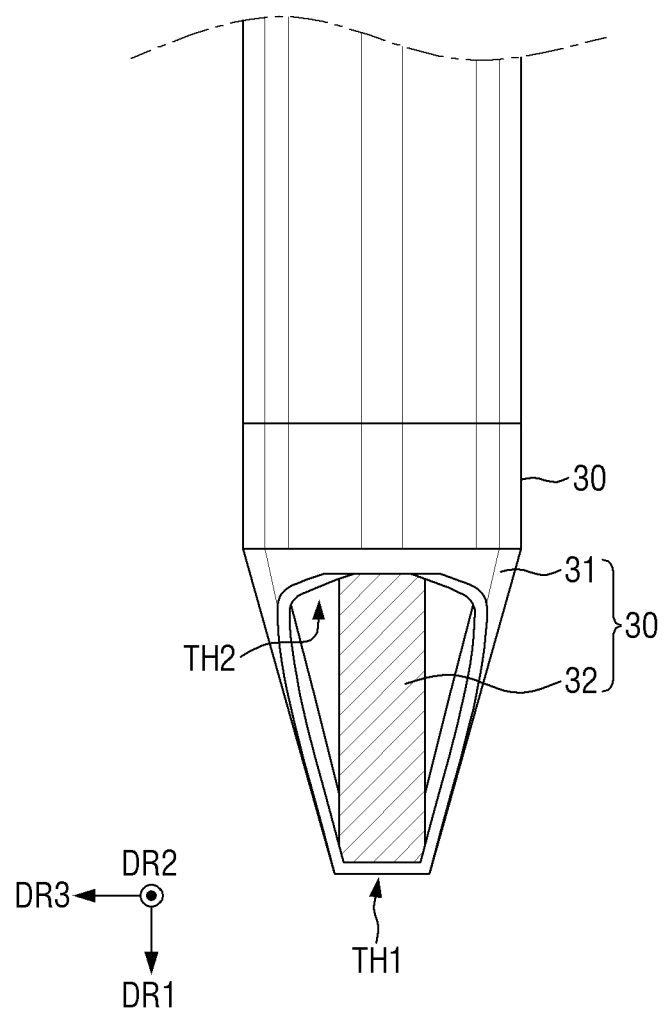
FIG. 6 is a plan view illustrating a pen tip portion of a smart pen according to one or more embodiments.
Figure 7:
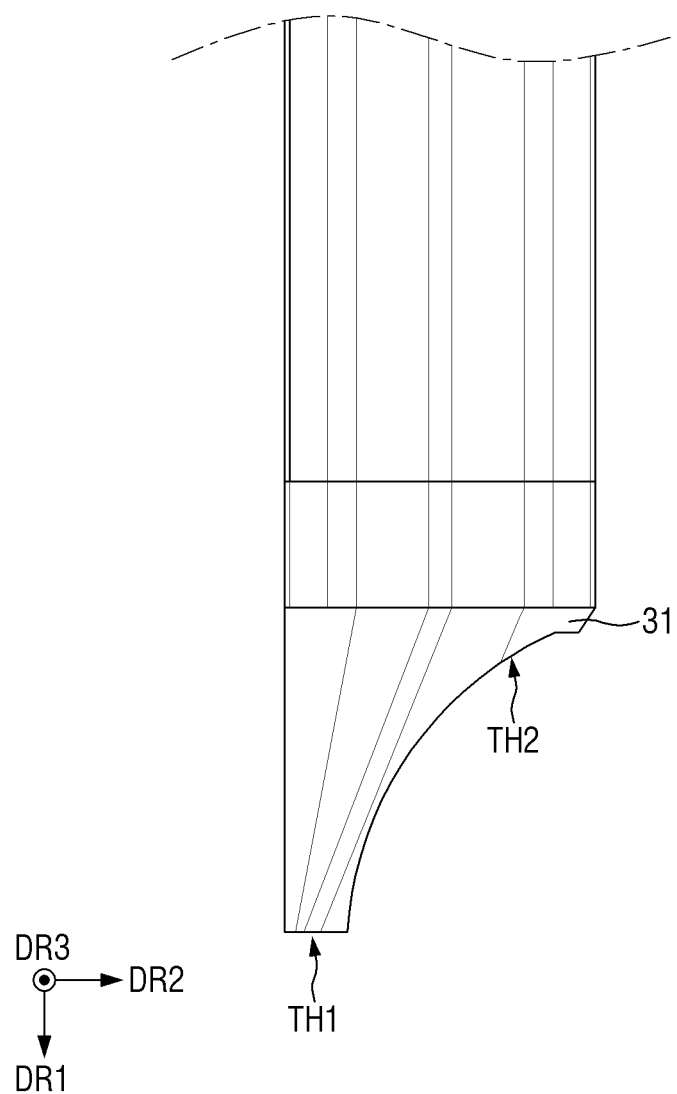
FIG. 7 is a side view illustrating a pen tip portion of a smart pen according to one or more embodiments.
Figure 8:
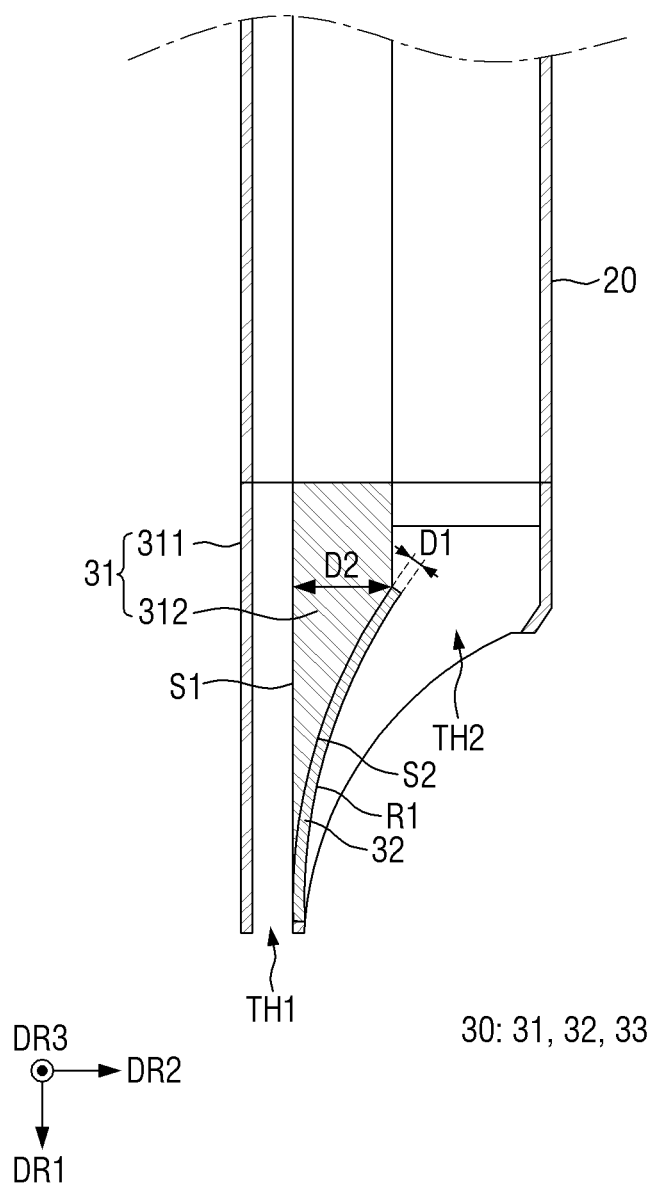
FIG. 8 is a side cross-sectional view illustrating a pen tip portion of a smart pen according to one or more embodiments.

FIG. 3 is a side view illustrating a smart pen according to one or more embodiments. FIG. 4 is an exploded perspective view of a smart pen according to one or more embodiments. FIG. 5 is a perspective view illustrating a pen tip portion of a smart pen according to one or more embodiments. FIG. 6 is a plan view illustrating a pen tip portion of a smart pen according to one or more embodiments. FIG. 7 is a side view illustrating a pen tip portion of a smart pen according to one or more embodiments. FIG. 8 is a side cross-sectional view illustrating a pen tip portion of a smart pen according to one or more embodiments.

Referring to FIGS. 3 to 8, the appearance of the smart pen 2 may be formed of the support portions 21 and 22 of the body 20 and the pen tip portion 30.

Referring to FIGS. 3 and 4, the first support 21 of the body 20 may form an outer side surface of the smart pen 2 in a cylindrical shape. For example, the first support 21 may be formed in a long rod shape in one direction to be accompanied by a handle function, so that the overall shape of the writing instrument may be achieved.

The controller 26, the light emitter 24, the light receiver 25, a circuit board 266 (e.g., see FIG. 12), a fixing portion 265 (e.g., see FIG. 12), and the light-transmitting layer 23 may be located on the first support 21. For example, inside the first support 21, the controller 26, the light emitter 24, the light receiver 25, the circuit board 266, the fixing portion 265, and the light-transmitting layer 23 may be connected to and fixed to the first support 21.

The second support 22 of the body 20 may be connected to and fixed to the first support 21. The light emitter 24 may be located on and fixed to the second support 22. A detailed description thereof will be given later with reference to FIG. 13.

Referring to FIGS. 3 to 8, the pen tip portion 30 may be located at one end of the body 20. For example, the pen tip portion 30 may be located in a first direction DR1 from one end of the first support 21 of the body 20.

The pen tip portion 30 allows light to be emitted from the light emitter 24 toward the display panel 110, and allows for a light receiving path (or a traveling path of the reflected light) of the reflected light reflected from the display panel 110. For example, in the pen tip portion 30, the light displayed on the display panel 110 and the light reflected from the display panel 110 may be re-reflected by the reflector 32 of the pen tip portion 30 and may be received at the light receiver 25. Accordingly, the pen tip portion 30 may have a shape that improves the light-receiving range of the light receiver 25. The light-receiving range will be described later with reference to FIG. 14.

The pen tip portion 30 includes a pen tip support 31, a pen tip 33 (e.g., see FIG. 9), and the reflector 32.

The pen tip 33 may be a structure for contacting the display panel 110. The pen tip 33 may be supported by the first support 21 and the pen tip support 31. The pen tip 33 may extend in one direction. The pen tip 33 may penetrate the pen tip support 31 in the first direction DR1, and may be in contact with one end of the first support 21 of the body 20.

The pen tip support 31 includes a first pen tip support 311 and a second pen tip support 312.

The first pen tip support 311 may form the overall appearance of the pen tip portion 30. For example, as illustrated in the drawing, the first pen tip support 311 may have a shape similar to a shape of one side of a writing instrument, such as a pen.

The first pen tip support 311 may extend in the first direction DR1 from one end of the body 20. The first pen tip support 311 may be formed at one end of the first support 21 in the first direction DR1.

The second pen tip support 312 may be formed on the inner side surface of the first pen tip support 311. The second pen tip support 312 may extend in the first direction DR1 from one end of the body 20. The second pen tip support 312 may serve to support the pen tip 33 together with the first pen tip support 311.

The pen tip support 31 may support the pen tip 33. For example, the first pen tip support 311 may surround a portion of the side surface of the pen tip 33, and the second pen tip support 312 may surround the rest of the side surface of the pen tip 33.

The pen tip support 31 may include, or define, a receiving hole TH1 in which the pen tip 33 is accommodated. The receiving hole TH1 may have a shape extending in the first direction of the pen tip support 31. The receiving hole TH1 may be defined as a space between the first pen tip support 311 and the second pen tip support 312, and may be surrounded by the first pen tip support 311 and the second pen tip support 312. Accordingly, the pen tip 33 may be supported by the receiving hole TH1 formed of the first pen tip support 311 and the second pen tip support 312.

The shape of the receiving hole TH1 may have various shapes depending on the shape of the pen tip 33. For example, as illustrated in FIG. 5, the receiving hole TH1 may have a cylindrical shape elongated in the first direction DR1. In addition, when the shape of the pen tip 33 is a triangular shape or a polygonal shape, the receiving hole TH1 may also be formed in the same shape as the shape of the pen tip 33.

Referring to FIG. 8, the second pen tip support 312 includes a first surface S1 in one direction and a second surface S2 in the other direction. For example, the second pen tip support 312 may include a first surface S1 in contact with the pen tip 33, and a second surface S2 that is in contact with the reflector 32 and that is an opposite surface of the first surface S1. In this case, the first surface S1 may be a surface that is opposite to the first pen tip support 311 in the second direction DR2.

The second surface S2 of the second pen tip support 312 may have a curvature (e.g., predetermined curvature). For example, the second surface S2 may have a convex shape toward a direction that is opposite to the second direction DR2 (e.g., a direction toward the pen tip 33). For example, the second surface S2 may be formed as a portion of a circular shape having a curvature (e.g., predetermined curvature). A radius of curvature of the second surface S2 may be about 70 mm to about 100 mm.

The reflector 32 may be located on the second surface S2 of the second pen tip support 312.

An edge of the second surface S2 in the first direction DR1 may be aligned with an edge of the reflector 32 in the first direction DR1. The second surface S2 and the reflector 32 may completely overlap each other.

In addition, the second surface S2 of the second pen tip support 312 may cover the reflector 32 in the first direction DR1. For example, the reflector 32 may generally extend in the first direction DR1 between one side and the other side of the second surface S2. In the first direction DR1, the reflector 32 may have a size corresponding to the second surface S2. The reflector 32 may have a size covering the second surface S2 in the first direction DR1.

The width of the reflector 32 may be smaller than the width of the second pen tip support 312. The width of the reflector 32 may correspond to the length of the reflector 32 in the third direction DR3, and the width of the second pen tip support 312 may correspond to the length of the reflector 32 in the third direction DR3. For example, the reflector 32 may be smaller than a size corresponding to the second surface S2 in the third direction DR3. The reflector 32 may cover a portion of the second surface S2 in the third direction DR3. That is, the outer side surface of the reflector 32 may be positioned on the inner side than the side surface of the second surface S2. Alternatively, the reflector 32 may be spaced apart from the edge of the other side of the second pen tip support 312 toward the edge of the one side of the second pen tip support 312. Alternatively, the reflector 32 may also be spaced apart from the edge of the one side toward the edge of the other side of the second pen tip support 312.

A thickness D1 of the reflector 32 may have, for example, about ⅛ to about ½ of a maximum thickness D2 of the second pen tip support 312. Alternatively, the reflector 32 may have the thickness D1 in the range of about 1 mm to about 5 mm.

The reflector 32 may have a convex shape toward the pen tip 33. The reflector 32 may be formed as a portion of a circular shape having the same curvature (e.g., predetermined curvature) as the second surface S2. For example, the radius of curvature of the reflector 32 may be about 70 mm to about 100 mm. When the radius of curvature of the reflector 32 is smaller than about 70 mm, the light emitted from the light emitter 24 may not be widely spread, and thus a light-receiving range may be reduced. In addition, when the radius of curvature of the reflector 32 is greater than about 100 mm and a second angle θ2 formed with the display panel 110 of the smart pen 2 is greater than or equal to an angle (e.g., predetermined angle, for example, about 80 degrees), it may be difficult to secure a sufficient amount of light to be sensed, so that the light-receiving range may be lowered. Accordingly, the light-receiving range of the smart pen 2 may be improved by the radius of curvature (e.g., predetermined radius of curvature) of the reflector 32.

The reflector 32 may be formed of an infrared reflective material, such as barium sulfate or magnesium oxide, or may be formed of an infrared reflective material coated thereon, but is not limited thereto.

A light-transmitting hole TH2 that forms a path of light between the reflector 32 and the first pen tip support 311 may be included. The light-transmitting hole TH2 may have a hole shape extending in the first direction DR1 of the pen tip support 31. The light-transmitting hole TH2 is formed in the form of a through-hole in the inner center of the pen tip portion 30.

The shape of the light-transmitting hole TH2 may have various shapes. For example, as illustrated in FIG. 5, the light-transmitting hole TH2 may have a hole of a shape similar to a cylindrical form elongated in the first direction DR1.

The light-transmitting hole TH2 may be defined as a space between the first pen tip support 311 and the reflector 32 on the second pen tip support 312, and may be surrounded by the first pen tip support 311 and the reflector 32. A light path may be formed in a space in the shape of a through-hole of the light-transmitting hole TH2. For example, light emitted from the light emitter 24 may pass through the space of the light-transmitting hole TH2 and may be reflected by the reflector 32 to travel to the display panel 100, or may directly travel to the display panel 100 without passing through the reflector 32, and in addition, light from the display panel 110 or reflected light may pass through the light-transmitting hole TH2, and may be received by the light receiver 25.

Hereinafter, a corresponding shape and a light path of the light emitter 24 will be described with reference to FIGS. 9 to 12.

Figure 9:
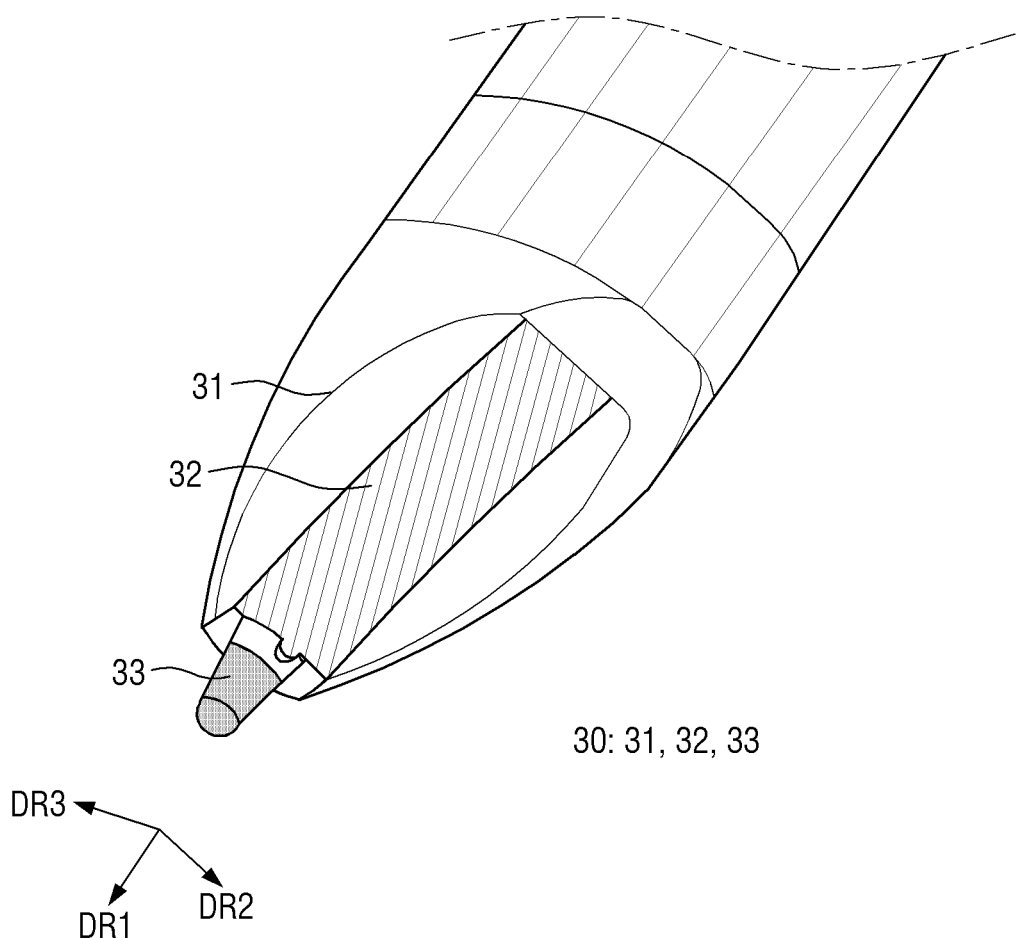
FIG. 9 is a rear perspective view illustrating a smart pen according to one or more embodiments.
Figure 11:
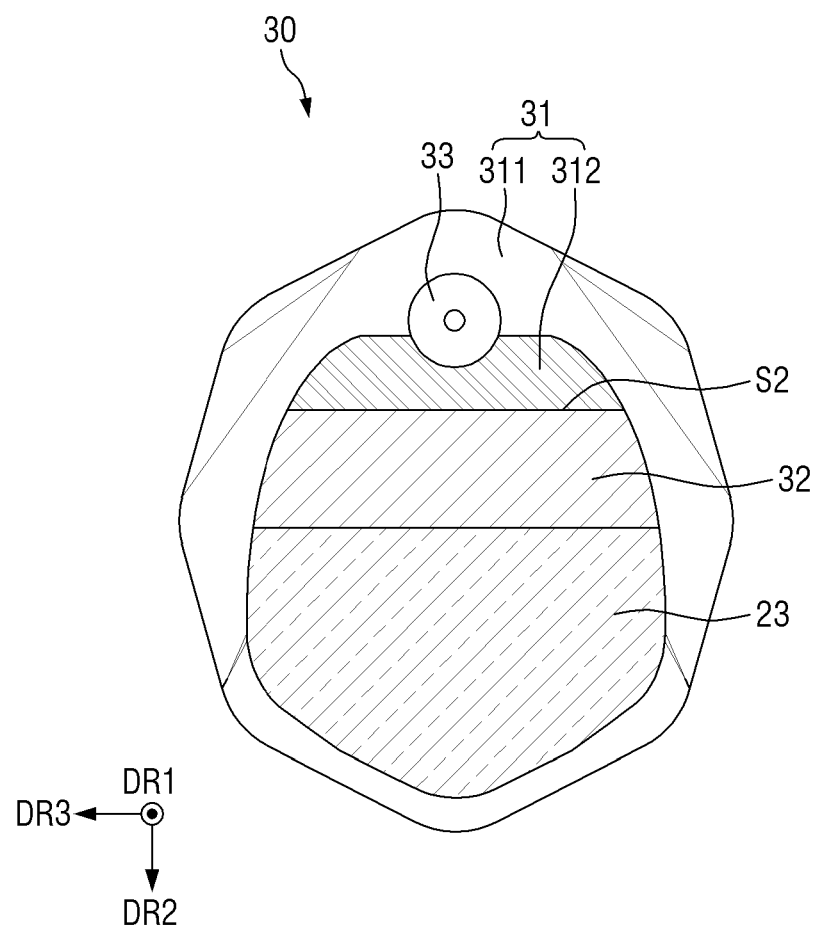
FIG. 11 is a front view illustrating a smart pen according to one or more embodiments.
Figure 12:
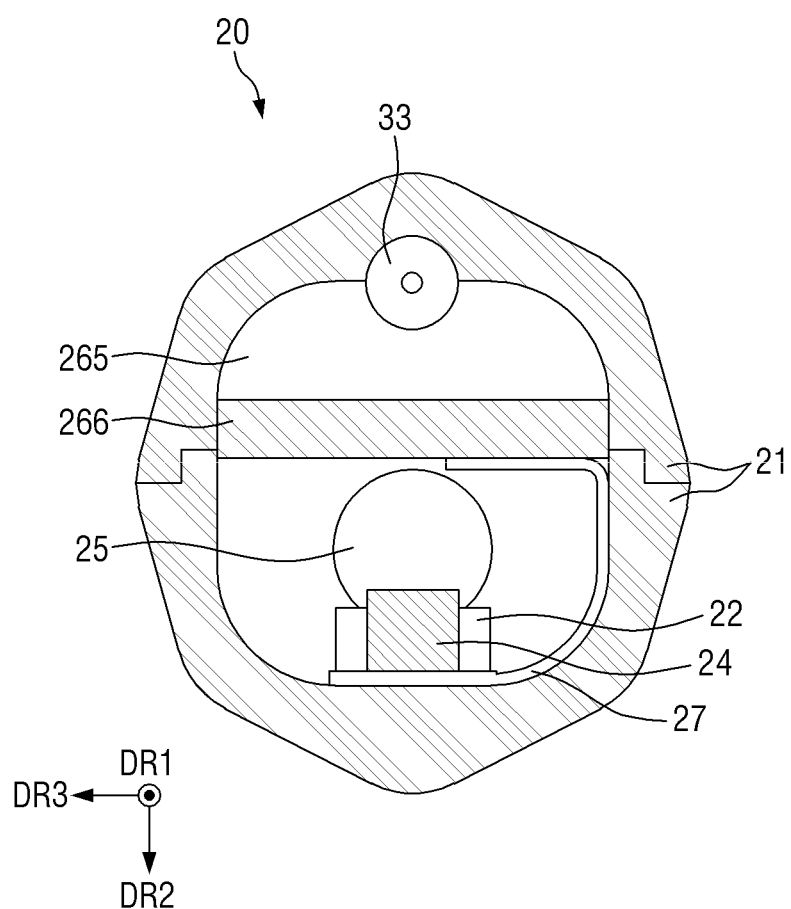
FIG. 12 is a front cross-sectional view illustrating a smart pen according to one or more embodiments.
Figure 13:
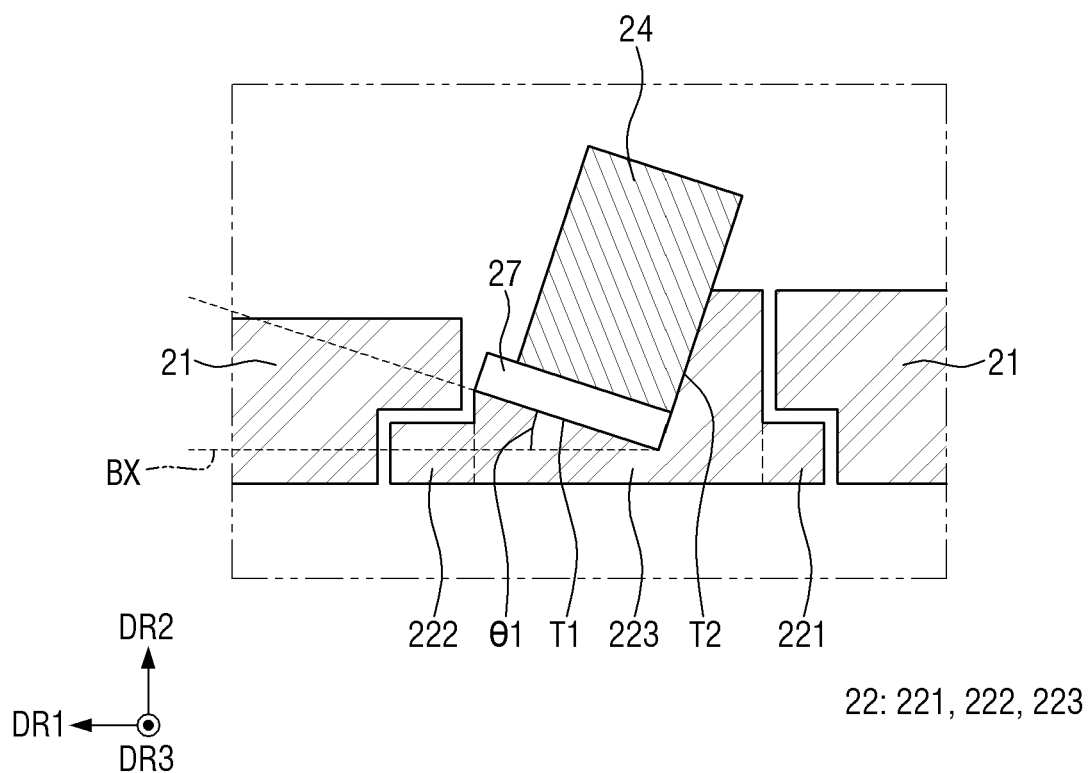
FIG. 13 is an enlarged cross-sectional view of a light emitter illustrated in FIG. 10.
Figure 14:
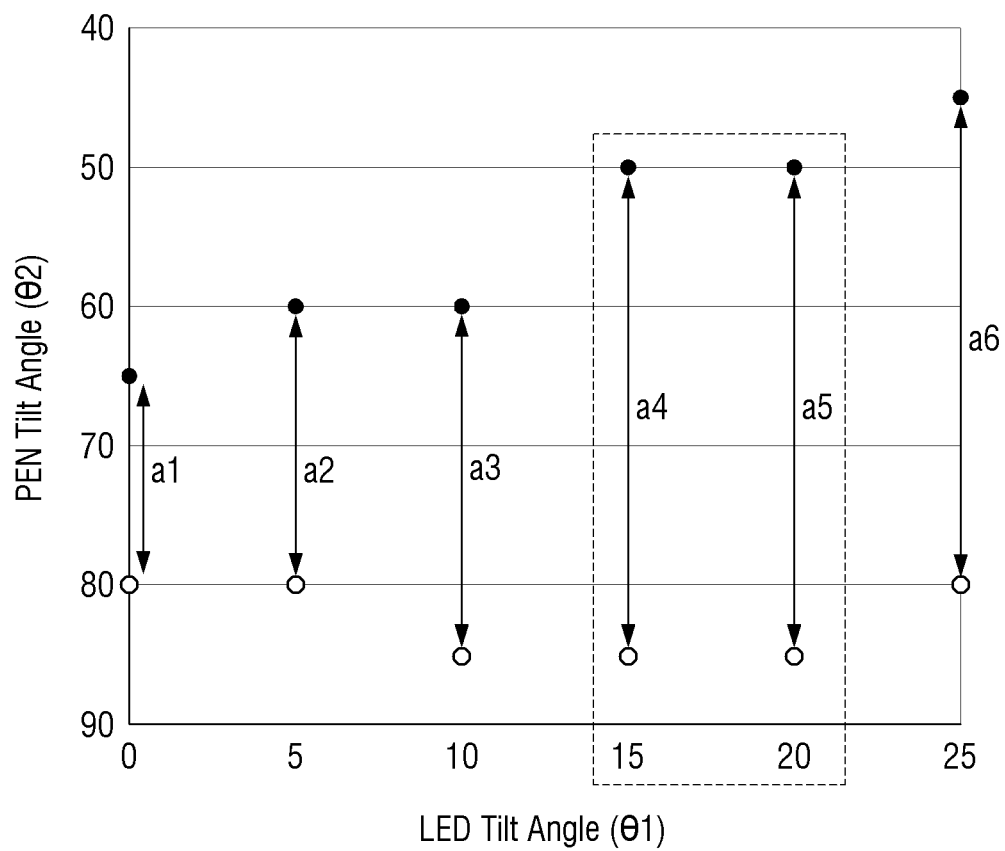
FIG. 14 is a graph illustrating a recognition degree according to an angle of the light emitter and an inclination angle of a smart pen.

FIG. 9 is a rear perspective view illustrating a smart pen according to one or more embodiments. FIG. 10 is a side cross-sectional view illustrating a structure of a smart pen according to one or more embodiments. FIG. 11 is a front view illustrating a smart pen according to one or more embodiments. FIG. 12 is a front cross-sectional view illustrating a smart pen according to one or more embodiments. FIG. 13 is an enlarged cross-sectional view of a light emitter illustrated in FIG. 10. FIG. 14 is a graph illustrating a recognition degree according to an angle of the light emitter and an inclination angle of a smart pen.

Referring to FIGS. 9 to 12, the body 20 of the smart pen 2 includes a fixing portion 265, the circuit board 266, the light emitter 24, the light receiver 25, the light-transmitting layer 23, and a light emitting circuit board 27.

The fixing portion 265 is located inside the body 20. The fixing portion 265 may be located inside the first support 21. The fixing portion 265 may extend in the first direction DR1. In addition, the fixing portion 265 may be located up to one end of the body 20 in the first direction DR1 to be in contact with the pen tip portion 30. Accordingly, one end of the fixing portion 265 may be aligned with one end of the first support 21.

The fixing portion 265 serves to support the pen tip 33 together with the first support 21. A hole defined as a space between the fixing portion 265 and the first support 21 may extend in the first direction DR1. A hole defined as a space between the fixing portion 265 and the first support 21 may overlap the receiving hole TH1 of the pen tip portion 30 in the first direction DR1. Accordingly, the pen tip 33 may be located in the hole and in the receiving hole TH1 defined by the fixing portion 265 and the first support 21.

The circuit board 266 may be located on the fixing portion 265. The circuit board 266 may extend in the first direction DR1. The circuit board 266 may be electrically connected to the light receiver 25 and the controller 26. The circuit board 266 may transmit image data received by the light receiver 25 to the controller 26. The controller 26 may be mounted on one surface of the circuit board 266. The circuit board 266 may be a printed circuit board. The controller 26 may be an integrated circuit.

The light-transmitting layer 23 may be located between the fixing portion 265 and the first support 21 in the second direction DR2. One surface of the light-transmitting layer 23 may be aligned with an edge of the fixing portion 265. The light-transmitting layer 23 may extend inside the first support 21 in the second direction DR2. The edge of the light-transmitting layer 23 may be in contact with the circuit board 266. Accordingly, the light-transmitting hole TH2 of the pen tip portion 30 may be covered.

The light-transmitting layer 23 may selectively transmit infrared light. The light-transmitting layer 23 may serve as a band-pass filter that transmits light having an infrared wavelength and that blocks light having other wavelengths. For example, the light-transmitting layer 23 may transmit light having a wavelength of about 700 nm or more.

The light receiver 25 may extend in the first direction DR1 of the circuit board 266. For example, the light receiver 25 may be located inside the first support 21. The light receiver 25 may be located between the first support 21 and the circuit board 266 in the second direction DR2.

The light receiver 25 may be spaced apart from the light-transmitting layer 23 in the first direction DR1. That is, because the light receiver 25 is spaced apart from the light-transmitting layer 23 in the first direction DR1, the light receiver 25 may be spaced apart from the pen tip portion 30 in the first direction DR1. For example, the light receiver 25 may be spaced apart from the light-transmitting layer 23 by a third distance D3 in the first direction DR1.

The light receiver 25 is embedded in the first support 21 of the body 20, and receives infrared light that is reflected from the display panel 110 and the reflector 32 of the pen tip portion 30 and that is incident thereon through the light-transmitting hole TH2. Accordingly, the light receiver 25 may detect image data for the code patterns through the received infrared light.

In one or more embodiments, the light receiver 25 may further include a light-receiving support portion. The light-receiving support portion may surround the outside of the light receiver 25, and may be supported by the body 20. The light receiver 25 may be supported by the light-receiving support portion.

Referring to FIGS. 10 to 13, the light emitter 24 may be located adjacent to the second support 22 in a space between the light-transmitting layer 23 and the light receiver 25. For example, in plan view defined by the first direction DR1 and the second direction DR2, the light emitter 24 may be mounted on the top surface of the second support 22 of the body 20, and may be located inside the body 20.

In addition, the light emitter 24 may be spaced apart from each of the light-transmitting layer 23 and the light receiver 25. For example, when the light emitter 24 is located in the space between the light receiver 25 and the light-transmitting layer 23, as illustrated in FIG. 10, the light emitter 24 may be spaced apart from each of the light-transmitting layer 23 and the light receiver 25 by a distance (e.g., predetermined distance) along the first direction DR1.

The distance (e.g., predetermined distance) may be defined as a fourth distance D4 that is a distance between a center CC of the light emitter 24 in the first direction DR1 and one end of the light-transmitting layer 23 in the first direction DR1. In addition, it may be defined as a fifth distance D5 that is a distance between the center CC of the light emitter 24 in the first direction DR1 and one end of the light receiver 25 in the first direction DR1. That is, the center CC of the light emitter 24 may be spaced apart from one end of the light-transmitting layer 23 by the fourth distance D4, and the center CC of the light emitter 24 may be spaced apart from one end of the light receiver 25 by the fifth distance D5.

Accordingly, the third distance D3 between the light receiver 25 and the light-transmitting layer 23 may be greater than the fourth distance D4 between the light emitter 24 and the light-transmitting layer 23. The third distance D3 between the light receiver 25 and the light-transmitting layer 23 may be greater than the fourth distance D4 between the light emitter 24 and the light-transmitting layer 23 by the fifth distance D5.

The light emitter 24 emits infrared light toward the light-transmitting layer 23. Infrared light incident toward the light-transmitting layer 23 may travel to the display panel 100 through the light-transmitting hole TH2 of the first pen tip support 311, or may travel to the reflector 32.

The light emitter 24 may be located on, and fixed to, the second support 22. The second support 22 may support the light emitter 24, and the second support 22 may be connected to, and fixed to, the first support 21. For example, the second support 22 includes a first fixing portion 221, a second fixing portion 222, and a light emitter support portion 223.

The first fixing portion 221 may extend from one end of the light emitter support portion 223 in the first direction DR1, and may overlap the first support 21 in the second direction DR2.

The second fixing portion 222 may extend from the other end of the light emitter support portion 223 in the first direction DR1, and may overlap the first support 21 in the second direction DR2.

The light emitter support portion 223 includes a second support surface T2 that supports a rear surface of the light emitting surface of the light emitter 24, and includes a first support surface T1 that supports a side surface of the controller 26. Accordingly, the light emitter 24 may be located on, or above, the first support surface T1 and the second support surface T2 of the light emitter support portion 223, and may emit light along the front surface direction of the second support surface T2. The first support surface T1 and the second support surface T2 may be orthogonal to each other.

The first support surface T1 of the light emitter support portion 223 has an angle (e.g., predetermined angle) with respect to an imaginary axis BX extending in the first direction DR1. The imaginary axis BX may be an axis extending along the first direction DR1, but the embodiments of the specification are not limited thereto.

That is, an angle formed by the side surface of the first support surface T1 with respect to the imaginary axis BX may be defined as a first angle θ1. For example, the first angle θ1 may have a range of about 15 degrees to about 20 degrees. That is, because the light emitter 24 is located on the light emitter support portion 223 inclined at the first angle θ1 with respect to the imaginary axis BX, the light emitter 24 may also be inclined at the first angle θ1 with respect to the imaginary axis BX.

The light emitter 24 may be inclined at the first angle θ1 to emit light, and the light may be reflected by the reflector 32 to travel to the display panel 100. For example, the light emitter 24 may emit a direct light L1 that travels directly to the display panel 110, and may emit an indirect light L2 that is reflected by the reflector 32 and travels therefrom.

Accordingly, the light receiver 25 may sense the light reflected from the display panel 100. For example, the light receiver 25 may sense a directly received light L3 in which the indirect light L2 is directly received by the light receiver 25, and an indirectly received light L4 in which the direct light L1 is reflected by the reflector 32 to be received. However, the present disclosure is not limited thereto, and the light receiver 25 may sense light in which the direct light L1 is directly received and light in which the indirect light L2 is reflected by the reflector 32 to be received. In addition, light emitted from the display panel 110 may also be sensed as well as light from the light emitter 24.

In FIG. 14, the angle at which the light emitter 24 is inclined with respect to the imaginary axis X is illustrated on the X-axis, and the angle at which the smart pen 2 is inclined with respect to the display panel 100 is illustrated on the Y-axis.

Referring further to FIG. 14, when the code pattern CDP of FIG. 22 is detected by inclining the smart pen 2 at a second angle θ2 with respect to the imaginary axis BX extending along the first direction DR1, an appropriate amount of light is required. In this case, light-receiving ranges a1 to a6 may vary according to the first angle θ1 of the light emitter 24 and according to the second angle θ2 that is an inclined angle of the smart pen 2. That is, the light-receiving range refers to a range of the second angle θ2 at which the light receiver 25 may receive light equal to or greater than the sensible amount of light at the preset first angle θ1.

For example, when the first angle θ1 is about 0 degrees, the light receiver 25 may receive light within a range in which the second angle θ2 is inclined by about 65 degrees to about 80 degrees. That is, when the first angle θ1 is about 0 degrees, the light receiver 25 may sense the code pattern CDP in FIG. 22 in the light-receiving range a1 in which the second angle θ2 is about 65 degrees to about 80 degrees.

When the first angle θ1 is about 5 degrees, the light receiver 25 may receive light within a range in which the second angle θ2 is inclined by about 60 degrees to about 80 degrees. That is, when the first angle θ1 is about 5 degrees, the light receiver 25 may sense the code pattern CDP in FIG. 22 in the light-receiving range a2 in which the second angle θ2 is about 60 degrees to about 80 degrees.

When the first angle $\theta 1$ is about 10 degrees, the light receiver 25 may receive light within a range in which the second angle $\theta 2$ is inclined by about 60 degrees to about 85 degrees. That is, when the first angle $\theta 1$ is about 10 degrees, the light receiver 25 may sense the code pattern CDP in FIG. 22 in the light-receiving range a3 in which the second angle $\theta 2$ is about 60 degrees to about 85 degrees.

When the first angle $\theta 1$ is about 15 degrees to about 20 degrees, the light receiver 25 may receive light within a range in which the second angle $\theta 2$ is inclined by about 50 degrees to about 85 degrees. That is, when the first angle $\theta 1$ is about 15 degrees to about 20 degrees, the light receiver 25 may sense the code pattern CDP in FIG. 22 in the light-receiving ranges a4 and a5 in which the second angle $\theta 2$ is about 50 degrees to about 85 degrees.

When the first angle $\theta 1$ is about 25 degrees, the light receiver 25 may receive light within a range in which the second angle $\theta 2$ is inclined by about 55 degrees to about 80 degrees. That is, when the first angle $\theta 1$ is about 25 degrees, the light receiver 25 may sense the code pattern CDP in FIG. 22 in the light-receiving range a6 in which the second angle $\theta 2$ is about 55 degrees to about 80 degrees.

In a range in which the first angle $\theta 1$ is about 15 degrees, about 20 degrees, and about 25 degrees, the light receiver 25 may receive light even when the second angle $\theta 2$ is approximately 50 degrees. Accordingly, although the user uses the smart pen 2 at an angle, the light receiver 25 may receive light.

However, because the user frequently uses the smart pen 2 at an angle of about 80 degrees or more, it may be suitable to include a case where the light-receiving range is about 80 degrees or more. In addition, because the user does not frequently use the smart pen 2 at an angle of about 45 degrees or less, it may be irrelevant even if a case where the light-receiving range is about 45 degrees or less is excluded. Accordingly, it may be suitable that the second angle $\theta 2$ is about 50 degrees to about 85 degrees rather than about 45 degrees to about 80 degrees.

That is, when the first angle $\theta 1$ is about 15 degrees to about 20 degrees, the light-receiving range includes an angle range in which the user inclines the smart pen 2 more frequently than when the first angle $\theta 1$ is about 25 degrees. Accordingly, the inclined first angle $\theta 1$ of the light emitter 24 is, for example, about 15 degrees to about 20 degrees. Accordingly, when the light emitter 24 is inclined at an angle of about 15 degrees to about 20 degrees, it is possible to widen the light-receiving range of the light receiver 25 as much as possible according to the inclined angle of the smart pen 2.

Referring back to FIG. 10, the light emitting circuit board 27 may be located between the first support surface T1 of the second support 22 and the light emitter 24. The light emitting circuit board 27 may be electrically connected to the light emitter 24. The light emitting circuit board 27 may be attached on the circuit board 266 of the smart pen 2 using an anisotropic conductive film (ACF). The light emitting circuit board 27 may be a flexible printed circuit board, a printed circuit board, or a flexible film, such as a chip on film.

The light emitted from the light emitter 24 may be emitted toward one end of the pen tip portion 30 through the light-transmitting hole TH2 of the pen tip portion 30 to be reflected by the display panel 110. The light emitted through the light-transmitting hole TH2 may directly travel to the display panel 110, or may be reflected by the reflector 32 to indirectly travel to the display panel 110.

When the smart pen 2 is inclined at the second angle $\theta 2$ to emit light to the display panel 110 or to receive light displayed on the display panel 110, light may be diffusely reflected and lost on the surface of the display panel 110 due to a direction difference between an incident angle and a reflection angle with respect to the display panel 110. However, because the reflector 32 covers one side direction of the display panel 110 and because the light emitter 24 is inclined at the first angle 81, light reception efficiency may be improved.

Figure 15:
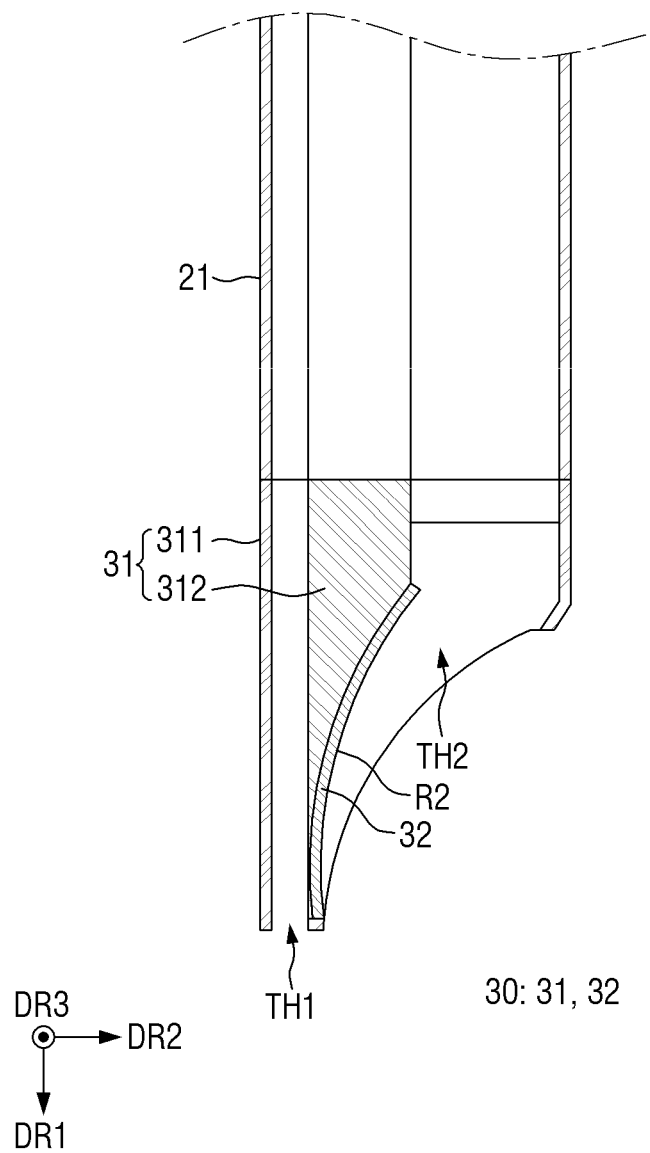
FIGS. 15 to 17 are side cross-sectional views illustrating a structure of a reflector of a smart pen according to one or more other embodiments.
Figure 16:
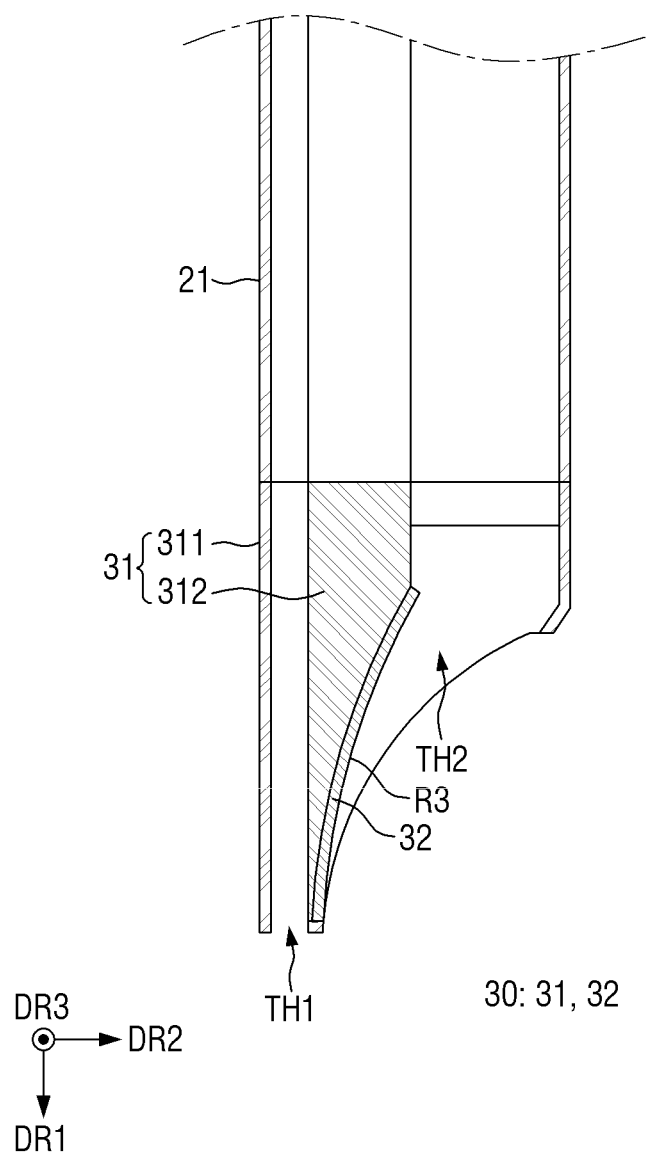
Figure 17:
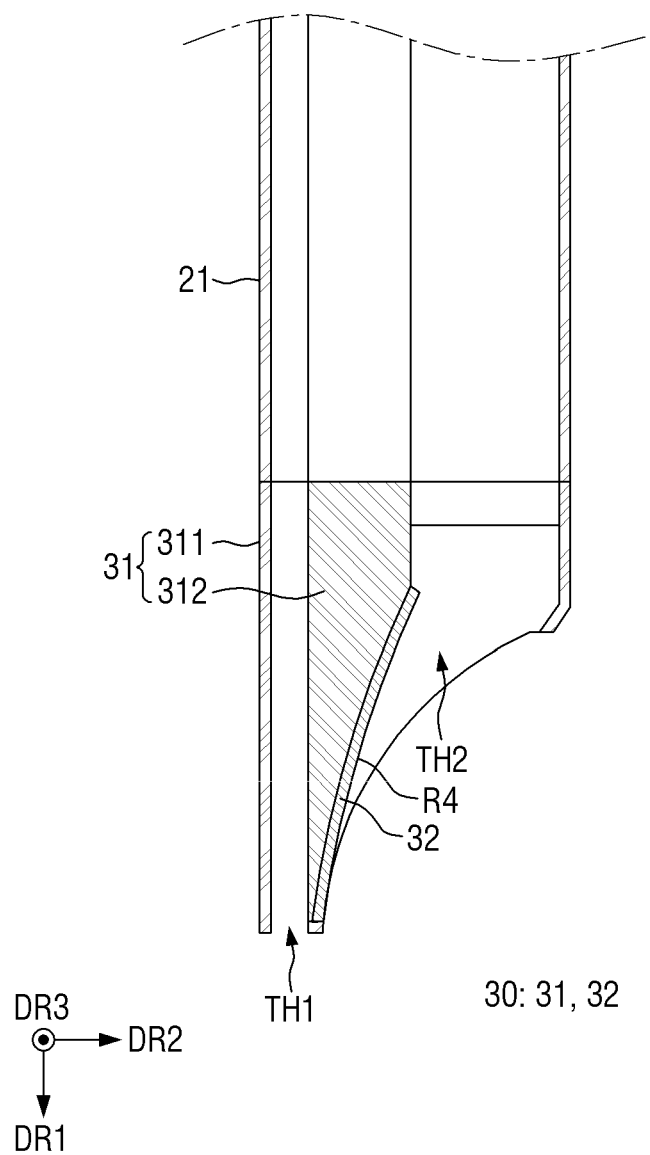

FIGS. 15 to 17 are side cross-sectional views illustrating a structure of a reflector of a smart pen according to one or more other embodiments.

Referring to FIGS. 15 to 17, the curvature of the reflector 32 located on the second surface S2 of the second pen tip support 312 may be deformed to be formed. In addition, the curvature of the second pen tip support 312 corresponding to the curvature of the reflector 32 may also be different in different embodiments.

For example, in FIGS. 8 to 13, the reflector 32 may have a first curvature R1, and the second pen tip support 312 may also correspond to the curvature of the reflector 32 to have the first curvature R1. In FIGS. 15 to 17, unlike in FIGS. 8 to 13, the reflector 32 may have a second curvature R2 to a fourth curvature R4 in respective embodiments.

For example, as illustrated in FIG. 15, the reflector 32 may have the second curvature R2 that is greater than the first curvature R1. The second curvature R2 may have a radius of curvature of about 80 mm. In addition, the second pen tip support 312 may also have a radius of curvature of about 80 mm. Alternatively, as illustrated in FIGS. 16 and 17, the reflector 32 may have the third curvature R3 and the fourth curvature R4, which are greater than the second curvature R2, respectively. The third curvature R3 and the fourth curvature R4 of the reflector 32 may have a radius of curvature of about 90 mm and about 100 mm, respectively, and the second pen tip support 312 may also correspond to the curvature of the reflector 32 to have a radius of curvature of about 90 mm and about 100 mm, respectively.

Also, the second to fourth curvatures R2 to R4 of the reflector 32 may reflect the light emitted from the light emitter 24 inclined at the first angle 81, and the reflected light may be reflected again by the reflector 32. Accordingly, the reflector 32 may improve the emission efficiency and light reception efficiency of the smart pen 2.

Figure 18:
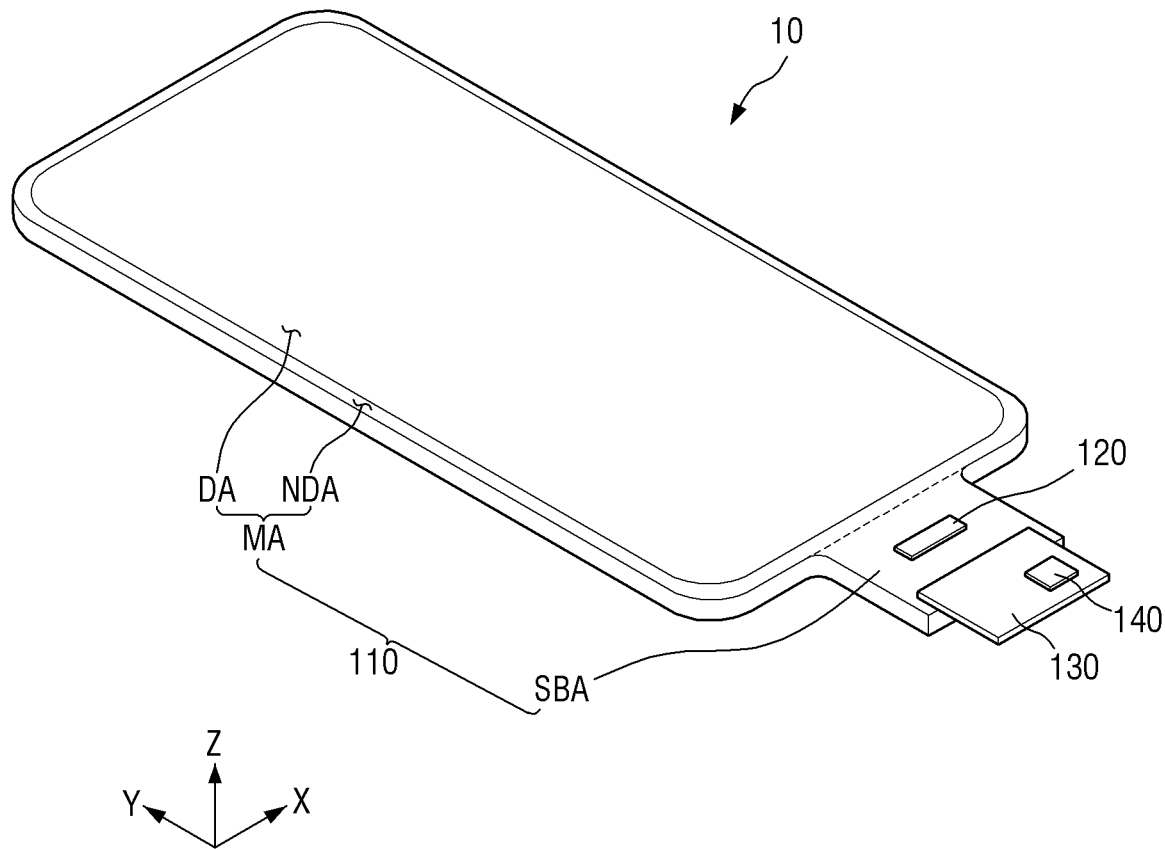
FIG. 18 is a perspective view illustrating a configuration of the display device shown in FIGS. 1 and 2.

FIG. 18 is a perspective view illustrating a configuration of the display device shown in FIGS. 1 and 2.

Referring to FIG. 18, a display device 10 may be applied to portable electronic devices, such as a mobile phone, a smartphone, a tablet personal computer, a mobile communication terminal, an electronic organizer, an electronic book, a portable multimedia player (PMP), a navigation system, an ultra-mobile PC (UMPC) or the like. For example, the display device 10 may be applied as a display of a television, a laptop, a monitor, a billboard, or an Internet-of-Things (IoT) device. For another example, the display device 10 may be applied to wearable devices, such as a smart watch, a watch phone, a glasses type display, or a head mounted display (HMD). As yet another example, the display device 10 may be applied to a dashboard of a vehicle, a center fascia of a vehicle, a center information display (CID) located on a dashboard of a vehicle, a room mirror display in place of side mirrors of a vehicle, or a display located on a rear surface of a front seat for rear seat entertainment of a vehicle.

The display device 10 may have a planar shape similar to a quadrilateral shape. For example, the display device 10 may have a shape similar to a quadrilateral shape, in plan view, having short sides in an X-axis direction and long sides in a Y-axis direction. The corner where the short side in the X-axis direction and the long side in the Y-axis direction meet may be rounded to have a curvature (e.g., predetermined curvature) or may be right-angled. The planar shape of the display device 10 is not limited to a quadrilateral shape, and may be formed in a shape similar to another polygonal shape, a circular shape, or elliptical shape.

The display device 10 may include the display panel 110, the display driver 120, the circuit board 130, and the touch driver 140.

The display panel 110 may include a main region MA and a sub-region SBA.

The main region MA may include the display area DA including pixels for displaying an image and the non-display area NDA located around the display area DA. The display area DA may emit light from a plurality of emission areas or a plurality of opening areas. For example, the display panel 110 may include a pixel circuit including switching elements, a pixel-defining layer defining an emission area or an opening area, and a self-light-emitting element.

The non-display area NDA may be an area outside the display area DA. The non-display area NDA may be defined as an edge area of the main region MA of the display panel 110. In one or more embodiments, the non-display area NDA may include a gate driver that supplies gate signals to the gate lines, and fan-out lines that connect the display driver 120 to the display area DA.

The sub-region SBA may extend from one side of the main region MA. The sub-region SBA may include a flexible material that can be bent, folded, or rolled. For example, when the sub-region SBA is bent, the sub-region SBA may overlap the main region MA in a thickness direction (Z-axis direction). The sub-region SBA may include the display driver 120 and a pad unit (e.g., a pad) connected to the circuit board 130. Optionally, the sub-region SBA may be omitted, and the display driver 120 and the pad may be arranged in the non-display area NDA.

The display driver 120 may output signals and voltages for driving the display panel 110. The display driver 120 may supply data voltages to data lines. The display driver 120 may supply a power voltage to the power line, and may supply gate control signals to the gate driver. The display driver 120 may be formed as an integrated circuit (IC), and may be mounted on the display panel 110 by a chip on glass (COG) method, a chip on plastic (COP) method, or an ultrasonic bonding method. For example, the display driver 120 may be located in the sub-region SBA, and may overlap the main region MA in the thickness direction (Z-axis direction) by bending of the sub-region SBA. For another example, the display driver 120 may be mounted on the circuit board 130.

The circuit board 130 may be attached to the pad of the display panel 110 by using an anisotropic conductive film (ACF). Lead lines of the circuit board 130 may be electrically connected to the pad of the display panel 110. The circuit board 130 may be a flexible printed circuit board, a printed circuit board, or a flexible film, such as a chip on film.

The touch driver 140 may be mounted on the circuit board 130. The touch driver 140 may be connected to the touch sensor of the display panel 110. The touch driver 140 may supply a touch-driving signal to a plurality of touch electrodes of the touch sensor and may sense an amount of change in capacitance between the plurality of touch electrodes. For example, the touch-driving signal may be a pulse signal having a frequency (e.g., predetermined frequency). The touch driver 140 may calculate whether a touch is inputted and touch coordinates based on an amount of change in capacitance between the plurality of touch electrodes. The touch driver 140 may be formed of an integrated circuit (IC).

Figure 19:
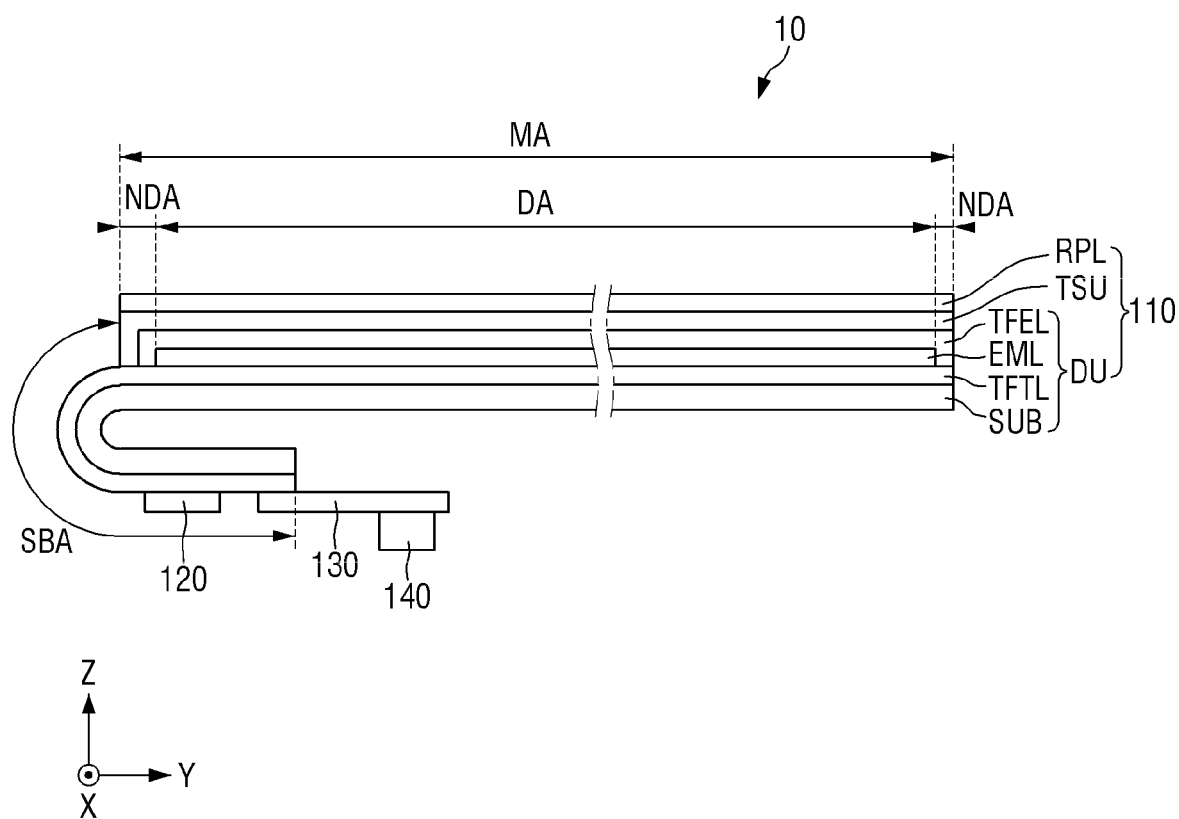
FIG. 19 is a cross-sectional view illustrating the display device shown in FIG. 1.

FIG. 19 is a cross-sectional view illustrating the display device shown in FIG. 1.

Referring to FIG. 19, the display panel 110 may include the display DU, the touch sensor TSU, and an anti-reflection layer RPL. The display DU may include the substrate SUB, the thin film transistor layer TFTL, the light-emitting element layer EML, and the encapsulation layer TFEL.

The substrate SUB may be a base substrate or a base member. The substrate SUB may be a flexible substrate that can be bent, folded or rolled. For example, the substrate SUB may include a glass material or a metal material, but is not limited thereto. For another example, the substrate SUB may include a polymer resin, such as polyimide (PI).

The thin film transistor layer TFTL may be located on the substrate SUB. The thin film transistor layer TFTL may include a plurality of thin film transistors constituting a pixel circuit of pixels. The thin film transistor layer TFTL may further include gate lines, data lines, power lines, gate control lines, fan-out lines that connect the display driver 120 to the data lines, and lead lines that connect the display driver 120 to the pad. Each of the thin film transistors may include a semiconductor region, a source electrode, a drain electrode, and a gate electrode. For example, when the gate driver is formed on one side of the non-display area NDA of the display panel 110, the gate driver may include thin film transistors.

The thin film transistor layer TFTL may be located in the display area DA, the non-display area NDA, and the sub-region SBA. Thin film transistors, gate lines, data lines, and power lines of each of the pixels of the thin film transistor layer TFTL may be located in the display area DA. Gate control lines and fan-out lines of the thin film transistor layer TFTL may be located in the non-display area NDA. The lead lines of the thin film transistor layer TFTL may be located in the sub-region SBA.

The light-emitting element layer EML may be located on the thin film transistor layer TFTL. The light-emitting element layer EML may include a plurality of light-emitting elements in which a first electrode, a light-emitting layer, and a second electrode are sequentially stacked to emit light, and a pixel-defining layer defining pixels. The plurality of light-emitting elements of the light-emitting element layer EML may be located in the display area DA.

For example, the light-emitting layer may be an organic light-emitting layer including an organic material. The light-emitting layer may include a hole-transporting layer, an organic light-emitting layer, and an electron-transporting layer. When the first electrode receives a voltage (e.g., predetermined voltage) through the thin film transistor of the thin film transistor layer TFTL, and when the second electrode receives the cathode voltage, holes and electrons may be transferred to the organic light-emitting layer through the hole-transporting layer and the electron-transporting layer, respectively, and may be combined with each other to emit light in the organic light-emitting layer. For example, the first electrode may be an anode electrode, and the second electrode may be a cathode electrode, but the present disclosure is not limited thereto.

For another example, the plurality of light-emitting elements may include a quantum dot light-emitting diode including a quantum dot light-emitting layer or an inorganic light-emitting diode including an inorganic semiconductor.

The encapsulation layer TFEL may cover the top surface and the side surface of the light-emitting element layer EML, and may protect the light-emitting element layer EML. The encapsulation layer TFEL may include at least one inorganic layer and at least one organic layer for encapsulating the light-emitting element layer EML.

The touch sensor TSU may be located on the encapsulation layer TFEL. The touch sensor TSU may include a plurality of touch electrodes for sensing a user's touch in a capacitive manner, and touch lines connecting the plurality of touch electrodes to the touch driver 140. For example, the touch sensor TSU may sense a user's touch by a self-capacitance method or a mutual capacitance method.

For another example, the touch sensor TSU may be located on a separate substrate located on the display DU. In this case, the substrate supporting the touch sensor TSU may be a base member that encapsulates the display DU.

The plurality of touch electrodes of the touch sensor TSU may be located in a touch sensor area overlapping the display area DA. The touch lines of the touch sensor TSU may be located in a touch peripheral area that overlaps the non-display area NDA.

The anti-reflection layer RPL may be located on the touch sensor TSU. The anti-reflection layer RPL may be attached onto the touch sensor TSU by an optically clear adhesive (OCA) film or an optically clear resin (OCR). For example, the anti-reflection layer RPL may include a phase retardation film, such as a linear polarizer plate and a quarter-wave (λ/4) plate. The phase retardation film and the linear polarizer plate may be sequentially stacked on the touch sensor TSU.

The sub-region SBA of the display panel 110 may extend from one side of the main region MA. The sub-region SBA may include a flexible material that can be bent, folded or rolled. For example, when the sub-region SBA is bent, the sub-region SBA may overlap the main region MA in a thickness direction (Z-axis direction). The sub-region SBA may include the display driver 120 and the pad connected to the circuit board 130.

Figure 20:
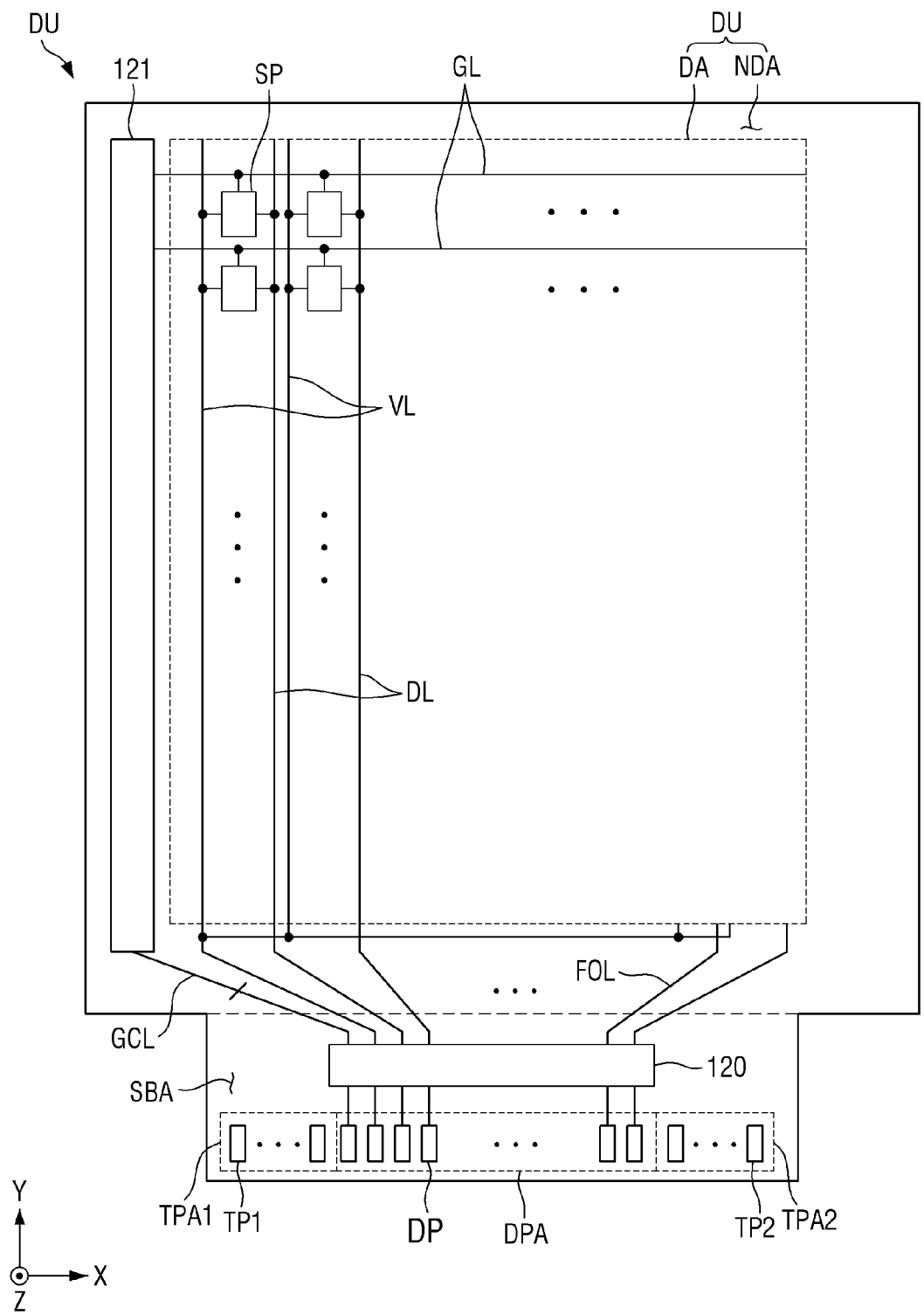
FIG. 20 is a plan view illustrating a display unit of a display device according to one or more embodiments.

FIG. 20 is a plan view illustrating a display of a display device according to one or more embodiments.

Referring to FIG. 20, the display DU may include the display area DA and the non-display area NDA.

The display area DA, which is an area for displaying an image, may be defined as the central area of the display panel 110. The display area DA may include a plurality of pixels SP, a plurality of gate lines GL, a plurality of data lines DL, and a plurality of power lines VL. Each of the plurality of pixels SP may be defined as the smallest unit that outputs light.

The plurality of gate lines GL may supply gate signals received from a gate driver 121 to the plurality of pixels SP. The plurality of gate lines GL may extend in the X-axis direction, and may be spaced apart from each other in the Y-axis direction that crosses the X-axis direction.

The plurality of data lines DL may supply the data voltages received from the display driver 120 to the plurality of pixels SP. The plurality of data lines DL may extend in the Y-axis direction, and may be spaced apart from each other in the X-axis direction.

The plurality of power lines VL may supply the power voltage received from the display driver 120 to the plurality of pixels SP. Here, the power voltage may be at least one of a driving voltage, an initialization voltage, or a reference voltage. The plurality of power lines VL may extend in the Y-axis direction, and may be spaced apart from each other in the X-axis direction.

The non-display area NDA may surround the display area DA. The non-display area NDA may include the gate driver 121, fan-out lines FOL, and gate control lines GCL. The gate driver 121 may generate a plurality of gate signals based on the gate control signal, and may sequentially supply the plurality of gate signals to the plurality of gate lines GL according to a set order.

The fan-out lines FOL may extend from the display driver 120 to the display area DA. The fan-out lines FOL may supply the data voltage received from the display driver 120 to the plurality of data lines DL.

The gate control line GCL may extend from the display driver 120 to the gate driver 121. The gate control line GCL may supply the gate control signal received from the display driver 120 to the gate driver 121.

The sub-region SBA may include the display driver 120, a display pad area DPA, and first and second touch pad areas TPA1 and TPA2.

The display driver 120 may output signals and voltages for driving the display panel 110 to the fan-out lines FOL. The display driver 120 may supply a data voltage to the data line DL through the fan-out lines FOL. The data voltage may be supplied to the plurality of pixels SP to determine the luminance of the plurality of pixels SP. The display driver 120 may supply the gate control signal to the gate driver 121 through the gate control line GCL.

The display pad area DPA, the first touch pad area TPA1, and the second touch pad area TPA2 may be located at the edge of the sub-region SBA. The display pad area DPA, the first touch pad area TPA1, and the second touch pad area TPA2 may be electrically connected to the circuit board 130 by using an anisotropic conductive film or a low-resistance high-reliability material, such as SAP.

The display pad area DPA may include a plurality of display pads DP. The plurality of display pads DP may be connected to the main processor 150 through the circuit board 130. The plurality of display pads DP may be connected to the circuit board 130 to receive digital video data, and may supply the digital video data to the display driver 120.

Figure 21:
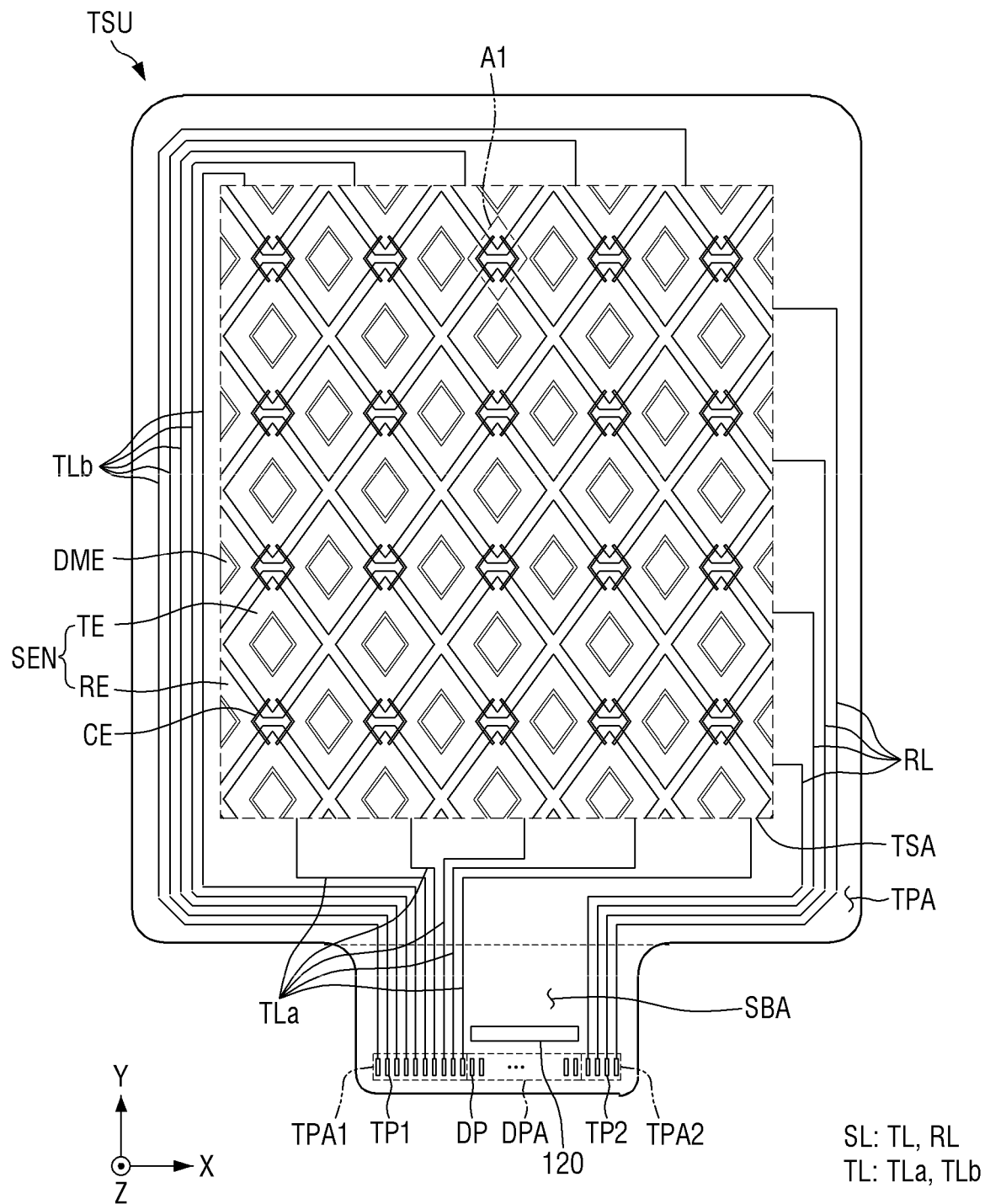
FIG. 21 is a plan view illustrating a touch-sensing unit (e.g., a touch sensor) of a display device according to one or more embodiments.

FIG. 21 is a plan view illustrating a touch sensor of a display device according to one or more embodiments.

Referring to FIG. 21, the touch sensor TSU may include a touch sensor area TSA for sensing a user's touch, and a touch peripheral area TPA located around the touch sensor area TSA. The touch sensor area TSA may overlap the display area DA of the display DU, and the touch peripheral area TPA may overlap the non-display area NDA of the display DU.

The touch sensor area TSA may include a plurality of touch electrodes SEN and a plurality of dummy electrodes DME. The plurality of touch electrodes SEN may form mutual capacitance or self-capacitance to sense a touch of an object or a person. The plurality of touch electrodes SEN may include a plurality of driving electrodes TE and a plurality of sensing electrodes RE.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent each other in the Y-axis direction may be electrically connected through a bridge electrode CE.

The plurality of driving electrodes TE may be connected to a first touch pad TP1 through a driving line TL. The driving line TL may include a lower driving line TLa and an upper driving line TLb. For example, some of the driving electrodes TE located under the touch sensor area TSA may be connected to the first touch pad TP1 through the lower driving line TLa, and the some other driving electrodes TE located on the upper side of the touch sensor area TSA may be connected to the first touch pad TP1 through the upper driving line TLb. The lower driving line TLa may extend to the first touch pad TP1 through the lower side of the touch peripheral area TPA. The upper driving line TLb may extend to the first touch pad TP1 through the upper side, the left side, and the lower side of the touch peripheral area TPA. The first touch pad TP1 may be connected to the touch driver 140 through the circuit board 130.

The bridge electrode CE may be bent at least once. For example, the bridge electrode CE may have an angle bracket shape (e.g., a "<" shape or a ">" shape), but the planar shape of the bridge electrode CE is not limited thereto. The driving electrodes TE adjacent to each other in the Y-axis direction may be connected by a plurality of bridge electrodes CE, and although any one of the bridge electrodes CE is disconnected, the driving electrodes TE may be stably connected through the remaining bridge electrode CE. The driving electrodes TE adjacent to each other may be connected by two bridge electrodes CE, but the number of bridge electrodes CE is not limited thereto.

The bridge electrode CE may be located on a different layer from the plurality of driving electrodes TE and the plurality of sensing electrodes RE. The sensing electrodes RE adjacent to each other in the X-axis direction may be electrically connected through a connection portion located on the same layer as the plurality of driving electrodes TE or the plurality of sensing electrodes RE, and the driving electrodes TE adjacent in the Y-axis direction may be electrically connected through the bridge electrode CE located on a different layer from the plurality of driving electrodes TE or the plurality of sensing electrodes RE. Accordingly, although the bridge electrode CE overlaps the plurality of sensing electrodes RE in the Z-axis direction, the plurality of driving electrodes TE and the plurality of sensing electrodes RE may be insulated from each other. Mutual capacitance may be formed between the driving electrode TE and the sensing electrode RE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent in the X-axis direction may be electrically connected through a connection portion.

The plurality of sensing electrodes RE may be connected to a second touch pad TP2 through a sensing line RL. For example, some of the sensing electrodes RE located on the right side of the touch sensor area TSA may be connected to the second touch pad TP2 through the sensing line RL. The sensing line RL may extend to the second touch pad TP2 through the right side and the lower side of the touch peripheral area TPA. The second touch pad TP2 may be connected to the touch driver 140 through the circuit board 130.

Each of the plurality of dummy electrodes DME may be surrounded by the driving electrode TE or the sensing electrode RE. Each of the dummy electrodes DME may be insulated by being spaced apart from the driving electrode TE or the sensing electrode RE. Accordingly, the dummy electrode DME may be electrically floating.

The display pad area DPA, the first touch pad area TPA1, and the second touch pad area TPA2 may be located at the edge of the sub-region SBA. The display pad area DPA, the first touch pad area TPA1, and the second touch pad area TPA2 may be electrically connected to the circuit board 130 by using an anisotropic conductive film or a low-resistance high-reliability material, such as SAP.

The first touch pad area TPA1 may be located on one side of the display pad area DPA, and may include a plurality of first touch pads TP1. The plurality of first touch pads TP1 may be electrically connected to the touch driver 140 located on the circuit board 130. The plurality of first touch pads TP1 may supply a touch-driving signal to the plurality of driving electrodes TE through a plurality of driving lines TL.

The second touch pad area TPA2 may be located on the other side of the display pad area DPA, and may include a plurality of second touch pads TP2. The plurality of second touch pads TP2 may be electrically connected to the touch driver 140 located on the circuit board 130. The touch driver 140 may receive a touch sensing signal through a plurality of sensing lines RL connected to the plurality of second touch pads TP2, and may sense a change in mutual capacitance between the driving electrode TE and the sensing electrode RE.

As another example, the touch driver 140 may supply a touch-driving signal to each of the plurality of driving electrodes TE and the plurality of sensing electrodes RE, and may receive a touch sensing signal from each of the plurality of driving electrodes TE and the plurality of sensing electrodes RE. The touch driver 140 may sense an amount of change in electric charge of each of the plurality of driving electrodes TE and the plurality of sensing electrodes RE based on the touch sensing signal.

FIG. 22 is an enlarged view of area A1 shown in FIG. 21. Moreover, FIG. 23 is an enlarged view illustrating a portion of the area A1 illustrated in FIG. 22.

Figure 23:
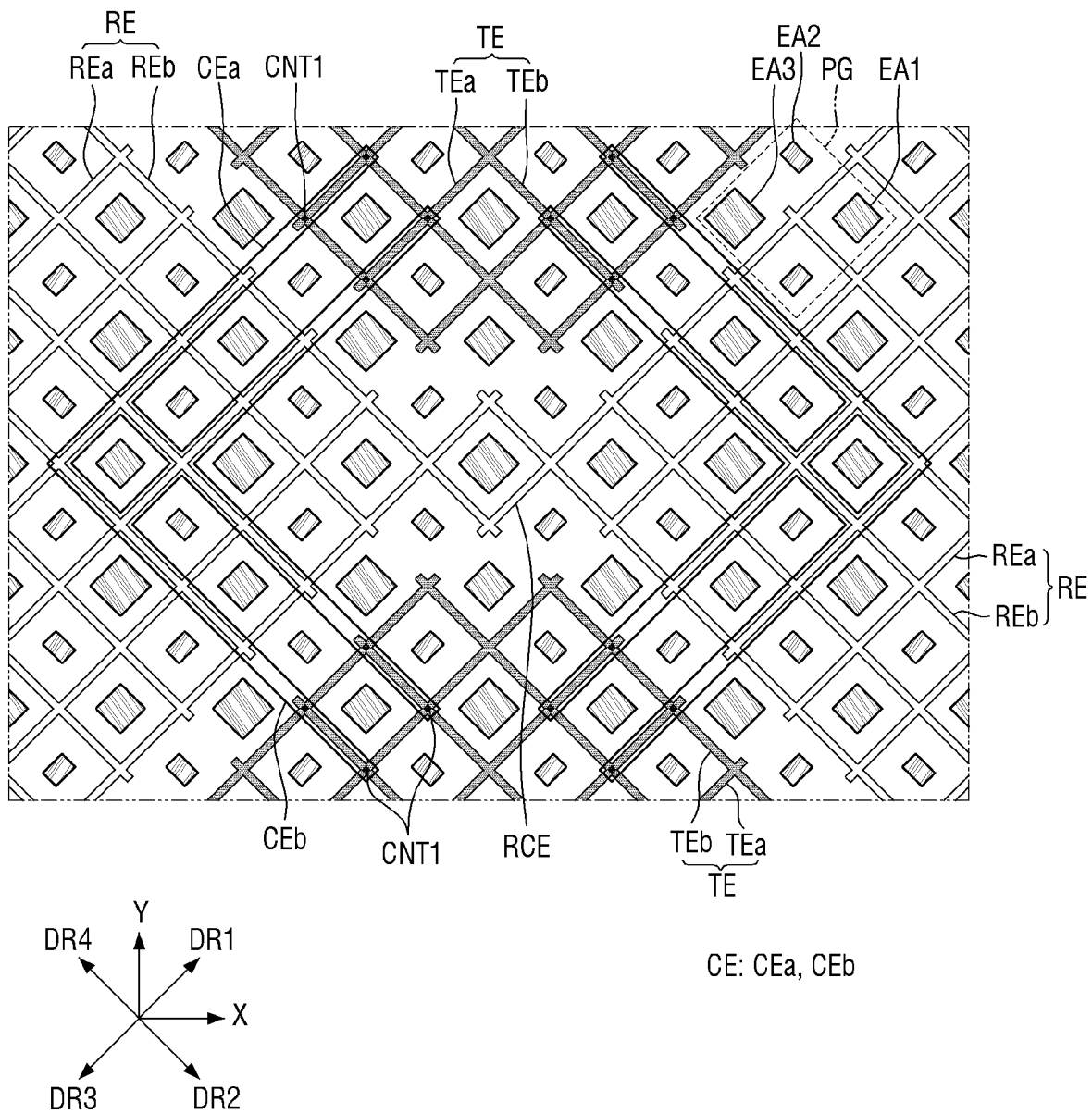
FIG. 23 is an enlarged view illustrating a portion of the area A1 illustrated in FIG. 22.

Referring to FIGS. 22 and 23, the plurality of driving electrodes TE, the plurality of sensing electrodes RE, and the plurality of dummy electrodes DME may be located on the same layer and may be spaced apart from each other.

The plurality of driving electrodes TE may be arranged in the X-axis direction and the Y-axis direction. The plurality of driving electrodes TE may be spaced apart from each other in the X-axis direction and the Y-axis direction. The driving electrodes TE adjacent in the Y-axis direction may be electrically connected through a bridge electrode CE.

The plurality of sensing electrodes RE may extend in the X-axis direction and may be spaced apart from each other in the Y-axis direction. The plurality of sensing electrodes RE may be arranged in the X-axis direction and the Y-axis direction, and the sensing electrodes RE adjacent in the X-axis direction may be electrically connected through a connection portion RCE. For example, the connection portion RCE of the sensing electrodes RE may be located within the shortest distance between the driving electrodes TE adjacent to each other.

The plurality of bridge electrodes CE may be located on a different layer from the driving electrode TE and the sensing electrode RE. The bridge electrode CE may include a first portion CEa and a second portion CEb. For example, the first portion CEa of the bridge electrode CE may be connected to the driving electrode TE located on one side through a first contact hole CNT1 and may extend in a third direction DR3. The second portion CEb of the bridge electrode CE may be bent from the first portion CEa in an area overlapping the sensing electrode RE to extend in a second direction DR2, and may be connected to the driving electrode TE located on the other side through the first contact hole CNT1. Hereinafter, a first direction DR1 may be a direction between the X-axis direction and the Y-axis direction, a second direction DR2 may be a direction between the X-axis direction and the opposite direction of the Y-axis, a third direction DR3 may be an opposite direction of the first direction DR1, and a fourth direction DR4 may be an opposite direction of the second direction DR2. Accordingly, each of the plurality of bridge electrodes CE may connect the adjacent driving electrodes TE in the Y-axis direction.

For example, the plurality of driving electrodes TE, the plurality of sensing electrodes RE, and the plurality of dummy electrodes DME may be formed in a planar mesh structure or a mesh structure. The plurality of driving electrodes TE, the plurality of sensing electrodes RE, and the plurality of dummy electrodes DME may surround each of first to third emission areas EA1, EA2, and EA3 of a pixel group PG in plan view. Accordingly, the plurality of driving electrodes TE, the plurality of sensing electrodes RE, and the plurality of dummy electrodes DME may not overlap first to third emission areas EA1, EA2, and EA3. The plurality of bridge electrodes CE may also not overlap the first to third emission areas EA1, EA2, and EA3. Accordingly, the display device 10 may reduce or prevent the likelihood of the luminance of light emitted from the first to third emission areas EA1, EA2, and EA3 being reduced by the touch sensor TSU.

Each of the plurality of driving electrodes TE may include a first portion TEa extending in the first direction DR1 and a second portion TEb extending in the second direction DR2. Each of the plurality of sensing electrodes RE may include a first portion REa extending in the first direction DR1 and a second portion REb extending in the second direction DR2.

At least some touch electrodes SEN among the plurality of touch electrodes SEN may include the code pattern CDP. At least some driving electrodes TE among the plurality of driving electrodes TE or at least some sensing electrodes RE among the plurality of sensing electrodes RE may include the code pattern CDP. The code pattern CDP may include a plurality of code patterns cut according to a corresponding criterion and having position information. The plurality of code patterns may correspond to values of the preset data codes. For example, the plurality of code patterns may be provided by cutting one of the plurality of stems extending from the crossing points of at least some of the touch electrodes SEN, but are not limited thereto. The plurality of stems of at least some of the touch electrodes SEN may extend in first to fourth directions DR1, DR2, DR3, and DR4 from the crossing point, and a stem extending in one direction of the first to fourth directions DR1, DR2, DR3, and DR4 may be cut. The cutting direction of the stem may correspond to a value of a preset data code constituting the position information.

The plurality of pixels may include first to third sub-pixels, and each of the first to third sub-pixels may include the first to third emission areas EA1, EA2, and EA3. For example, the first emission area EA1 may emit light of a first color (e.g., red light), the second emission area EA2 may emit light of a second color (e.g., green light), and the third emission area EA3 may emit light of a third color (e.g., blue light), but is not limited thereto.

One pixel group PG may produce light of a white gray scale by including one first light-emitting area EA1, two second light-emitting areas EA2, and one third light-emitting area EA3. Accordingly, the white gray scale may be represented by a combination of light emitted from one first light-emitting area EA1, light emitted from two second light-emitting areas EA2, and light emitted from one third light-emitting area EA3.

Figure 24:
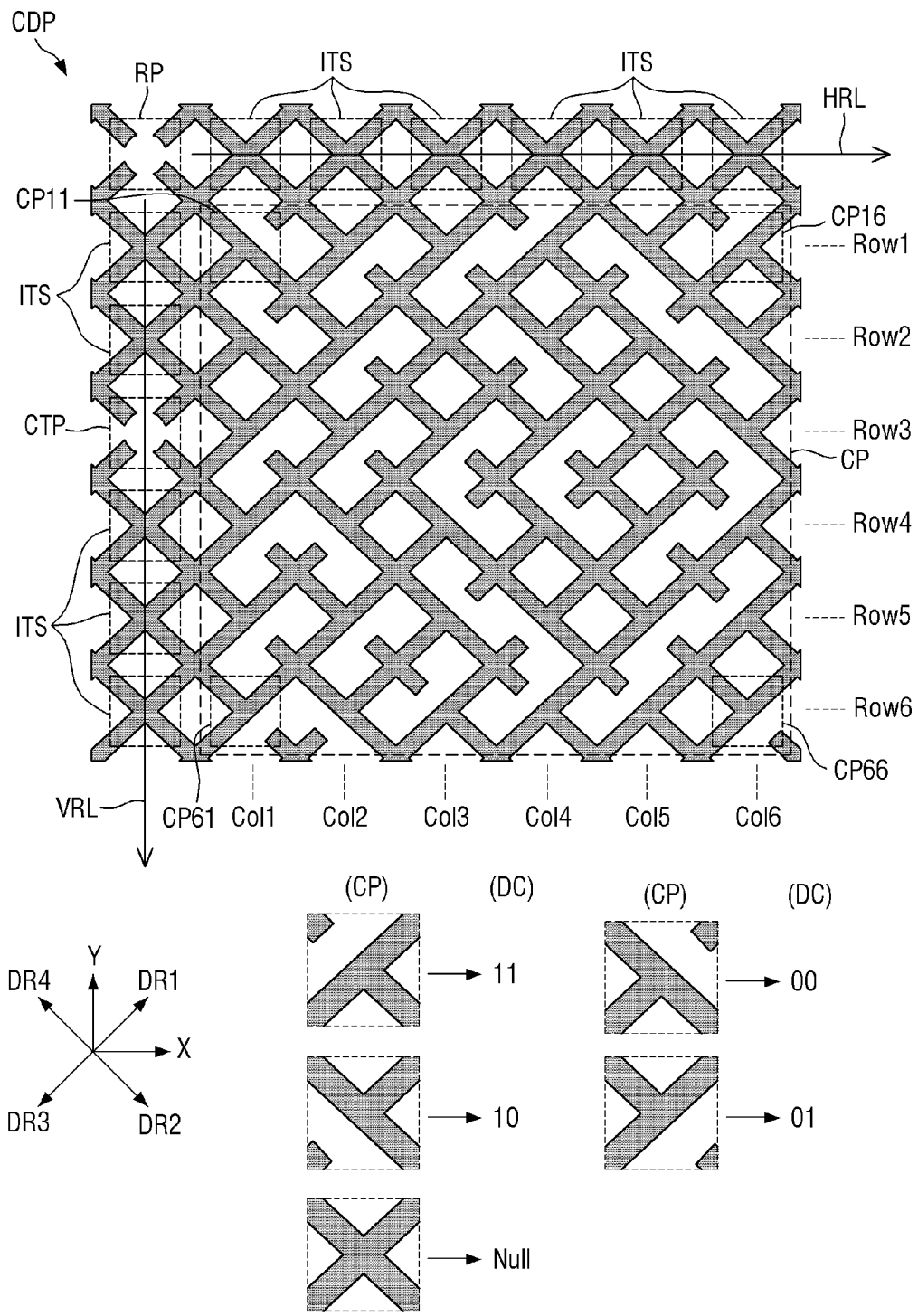
FIG. 24 is a view illustrating an example of a code pattern unit (e.g., code pattern) in a display device according to one or more embodiments.

FIG. 24 is a view illustrating an example of a code pattern in a display device according to one or more embodiments. Moreover, FIG. 25 is a diagram illustrating data codes corresponding to the code pattern of FIG. 24.

Referring to FIGS. 24 and 25, the plurality of touch electrodes SEN may be formed in a mesh structure or a mesh structure in plan view. Edges of the minimum unit of the plurality of touch electrodes SEN may cross each other in the first direction DR1 and the second direction DR2. At least some touch electrodes SEN among the plurality of touch electrodes SEN may include the code pattern CDP. At least some driving electrodes TE among the plurality of driving electrodes THE, or at least some sensing electrodes RE among the plurality of sensing electrodes RE, may include the code pattern CDP.

The code pattern CDP may include a reference point RP, a first (e.g., horizontal) reference line HRL, a second (e.g., vertical) reference line VRL, and a plurality of code patterns CP.

The reference point RP may be an identification reference of the code pattern CDP. For example, the reference point RP may correspond to an area in which crossing points of at least some of the touch electrodes SEN are cut. For example, the reference point RP may be located on the upper left end of the code pattern CDP, but is not limited thereto.

The first reference line HRL may extend in the X-axis direction from the reference point RP. The first reference line HRL may be defined by connecting a plurality of crossing points ITS located in the X-axis direction of the reference point RP. For example, when the first reference line HRL is defined by connecting six crossing points ITS, the plurality of code patterns CP may be arranged according to six columns including six crossing points ITS.

The second reference line VRL may extend in the Y-axis direction from the reference point RP. The second reference line VRL may be defined by connecting the plurality of crossing points ITS located in the Y-axis direction of the reference point RP to a cut portion CTP located between the plurality of crossing points ITS. For example, the second reference line VRL may be defined by connecting two crossing points ITS, one cut portion CTP, and three other crossing points ITS, and the plurality of code patterns CP may be arranged along six rows including five crossing points ITS and one cut portion CTP.

The plurality of code patterns CP may be located in an area defined by the first reference line HRL and the second reference line VRL. An inclination or rotation angle of the plurality of code patterns CP with respect to the camera may be sensed by the first reference line HRL and the second reference line VRL. For example, when the first reference line HRL is defined by connecting six crossing points ITS and the second reference line VRL is defined by connecting two crossing points ITS, one cut portion CTP, and three other crossing points ITS, the plurality of code patterns CP may be arranged in a 6-by-6 matrix.

The plurality of code patterns CP may be cut according to a corresponding criterion to have position information. The plurality of code patterns CP may correspond to a value of a preset data code DC. For example, the plurality of code patterns CP may be provided by cutting one of the plurality of stems extending from the crossing point of at least some of the touch electrodes SEN. The plurality of stems of at least some of the touch electrodes SEN may respectively extend in first to fourth directions DR1, DR2, DR3, and DR4 from the crossing point, and a stem extending in one direction of the first to fourth directions DR1, DR2, DR3, and DR4 may be cut. The cutting direction of the stem may correspond to a value of the preset data code DC constituting the position information. For example, the code pattern CP located in the $m^{th}$ row (m being a natural number) and the $n^{th}$ column (n being a natural number) may correspond to the data code DC located in the $m^{th}$ row and the $n^{th}$ column.

For example, the code pattern CP in which the stem that extends in the first direction DR1 is cut may correspond to the data code DC of [00]. The code pattern CP in which the stem that extends in the second direction DR2 is cut may correspond to the data code DC of [01]. The code pattern CP in which the stem that extends in the third direction DR3 is cut may correspond to the data code DC of [10]. The code pattern CP in which the stem that extends in the fourth direction DR4 is cut may correspond to the data code DC of [11].

An eleventh code pattern CP11 located in a first row Row1 and a first column Col1 may have a stem that is cut in the first direction DR1, and an eleventh data code DC11 may have a value of [00]. A sixty-first code pattern CP61 located in a sixth row Row6 and a first column Col1 may have a stem that is cut in the second direction DR2, and a sixty-first data code DC61 may have a value of [01]. A sixty-second code pattern located in the sixth row Row6 and a second column Col2 may have a stem that is cut in the third direction DR3, and a sixty-second data code may have a value of [10]. A sixteenth code pattern CP16 located in the first row Row1 and a sixth column Col6 may have a stem that is cut in the fourth direction DR4, and a sixteenth data code DC16 may have a value of [11]. A sixty-sixth code pattern CP66 located in the sixth row Row6 and the sixth column Col6 may have a stem that is cut in the second direction DR2, and a sixty-sixth data code DC66 may have a value of [01].

The plurality of code patterns CP may further include a conductive pattern in which the plurality of stems extending from the crossing point are not cut. The conductive pattern might not have a value of the data code DC (e.g., Null). The conductive pattern may be located at a suitable position so that the plurality of touch electrodes SEN may normally perform a touch operation. Because the plurality of code patterns CP include the conductive pattern, deterioration of the plurality of touch electrodes SEN may be reduced or prevented. For example, a twenty-third code pattern located in a second row Row2 and a third column Col3 may correspond to a conductive pattern, and a twenty-third data code may not have a value (Null).

The display device 10 may receive a touch input of a touch input device, such as a smart pen 2 by including the plurality of code patterns CP provided on at least some touch electrodes SEN among the plurality of touch electrodes SEN. The plurality of code patterns CP may be cut according to a corresponding criterion to have position information, and may correspond one-to-one to the preset data codes DC. Accordingly, the display device 10 may reduce cost, reduce power consumption, and simplify the driving process by receiving the generated coordinate data without complex computation and correction using the data code DC. In addition, the display device 10 may not be limited in size and may be applied to all electronic devices having a touch function by including the plurality of code patterns CP provided on at least some of the touch electrodes SEN.

Figure 26:
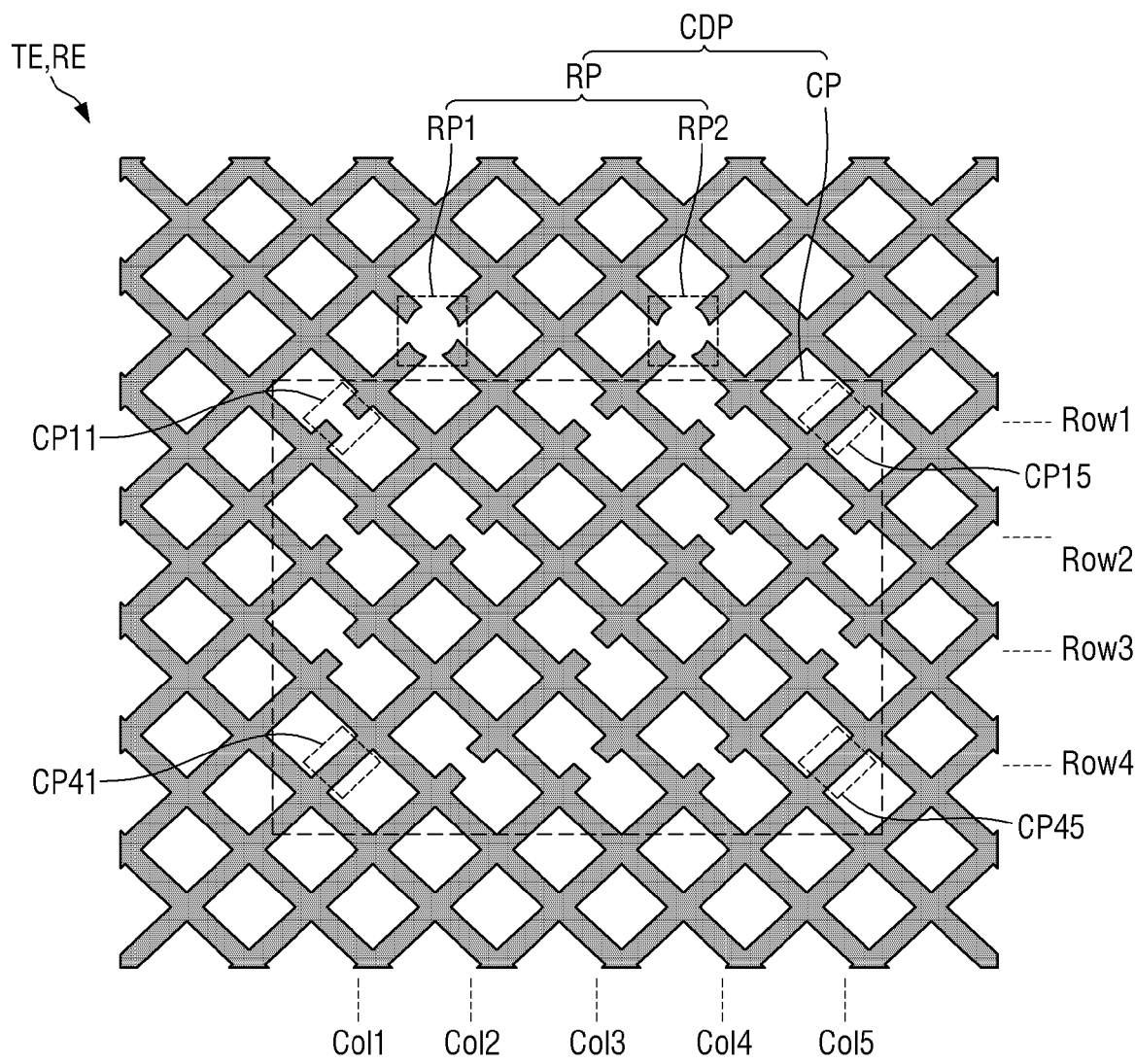
FIG. 26 is a view illustrating another example of a code pattern in a display device according to one or more embodiments.
Figure 27:
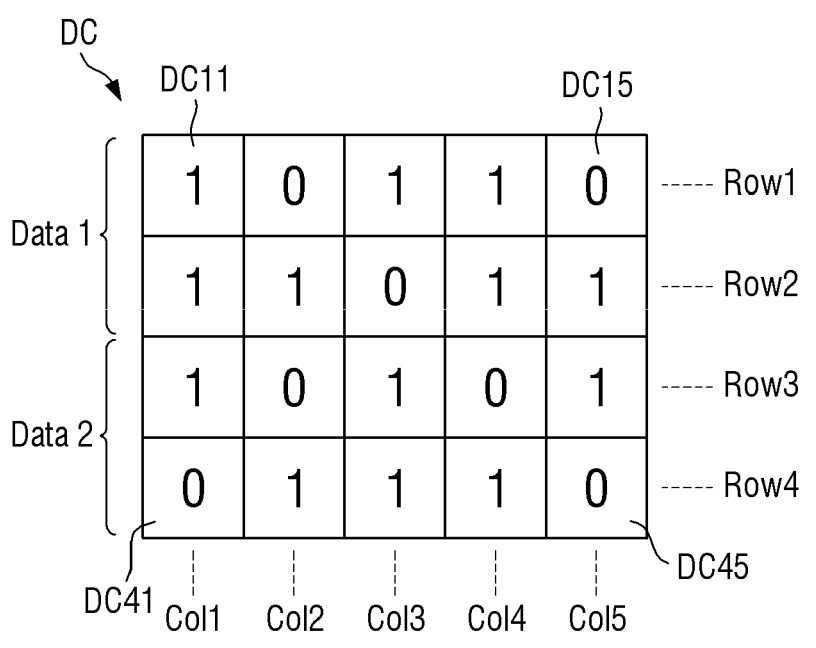

FIG. 26 is a view illustrating another example of a code pattern in a display device according to one or more embodiments, and FIG. 27 is a diagram illustrating data codes corresponding to the code pattern of FIG. 26.

Referring to FIGS. 26 and 27, the plurality of touch electrodes SEN may be formed in a mesh structure (e.g., in plan view). Edges of the minimum unit of the plurality of touch electrodes SEN may cross each other in the first direction DR1 and the second direction DR2. At least some touch electrodes SEN among the plurality of touch electrodes SEN may include the code pattern CDP. At least some driving electrodes TE among the plurality of driving electrodes TE or at least some sensing electrodes RE among the plurality of sensing electrodes RE may include the code pattern CDP.

The code pattern CDP may include the reference point RP and the plurality of code patterns CP.

The reference point RP may be an identification reference of the code pattern CDP. For example, the reference point RP may correspond to an area in which crossing points of at least some of the touch electrodes SEN are cut. The reference point RP may include first and second reference points RP1 and RP2. For example, the first and second reference points RP1 and RP2 may be spaced apart from each other on the top of the plurality of code patterns CP, but are not limited thereto.

The plurality of code patterns CP may be located in a preset area based on the first and second reference points RP1 and RP2. An inclination or rotation angle of the plurality of code patterns CP with respect to the camera may be sensed by the first and second reference points RP1 and RP2. For example, when the first and second reference points RP1 and RP2 are located to be spaced apart from each other in a corresponding row, the plurality of code patterns CP may be arranged in an m-by-n matrix starting from the next row of the row in which the first and second reference points RP1 and RP2 are located.

The plurality of code patterns CP may be cut according to a corresponding criterion to have position information. The plurality of code patterns CP may correspond to a value of a preset data code DC. For example, the plurality of code patterns CP may include some uncut edges and some other cut edges among a plurality of edges forming a mesh shape. Here, the central portion of the edge may be cut, but the cutting position is not limited thereto. The presence or absence of cutting of the plurality of edges may correspond to a value of the preset data code DC constituting the position information. For example, the code pattern CP located in the $m^{th}$ row and the $n^{th}$ column may correspond to the data code DC located in the $m^{th}$ row and the $n^{th}$ column. For example, the code pattern CP including the uncut edge may correspond to the data code DC of [0]. The code pattern CP including the cut edge may correspond to the data code DC of [1].

The eleventh code pattern CP11 located in the first row Row1 and the first column Col1 may include a cut edge, and the eleventh data code DC11 may have a value of [1]. A forty-fifth code pattern CP45 located in a fourth row Row4 and a fifth column Col5 may include an uncut edge, and a forty-fifth data code DC45 may have a value of [0]. Similarly, a fifteenth code pattern CP15 and a forty-first cod pattern CP41 may respectively correspond to a fifteenth data code DC15 of 0 and a forty-first data code DC41 of 0.

The data codes DC arranged in some rows may constitute a first data Data1 of the coordinate data, and the data codes DC arranged in some other rows may constitute a second data Data2 of the coordinate data. For example, the first data Data1 may correspond to the X-axis coordinates of the touch position, and the second data Data2 may correspond to the Y-axis coordinates of the touch position, but examples of the first and second data Data1 and Data2 are not limited thereto.

For example, as shown in FIG. 27 the data codes DC arranged in the first row Row1 and the second row Row2 may constitute the first data Data1 of the coordinate data, and the data code DC arranged in the third row Row3 and the fourth row Row4 may constitute the second data Data2 of the coordinate data. Accordingly, the plurality of code patterns CP may be converted into the corresponding data codes DC, and coordinate data may be rapidly generated based on the data codes DC without complex computation and correction.

The display device 10 may receive a touch input of a touch input device, such as a smart pen, by including the plurality of code patterns CP provided on at least some touch electrodes SEN among the plurality of touch electrodes SEN. The plurality of code patterns CP may be cut according to a corresponding criterion to have position information, and may correspond one-to-one to the preset data codes DC. Accordingly, the display device 10 may reduce cost, reduce power consumption, and simplify the driving process by receiving the generated coordinate data without complex computation and correction using the data code DC. In addition, the display device 10 may not be limited in size and may be applied to all electronic devices having a touch function by including the plurality of code patterns CP provided on at least some of the touch electrodes SEN.

Figure 28:
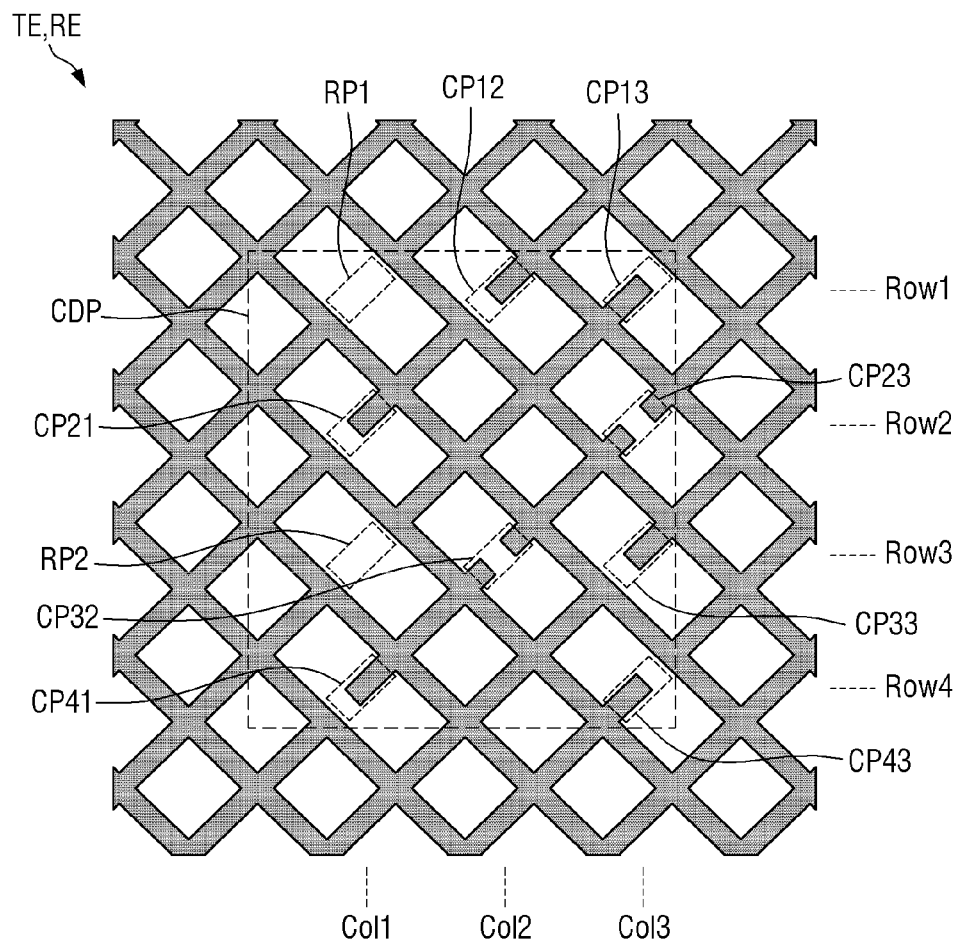
FIG. 28 is a view illustrating yet another example of a code pattern in a display device according to one or more embodiments.
Figure 28:
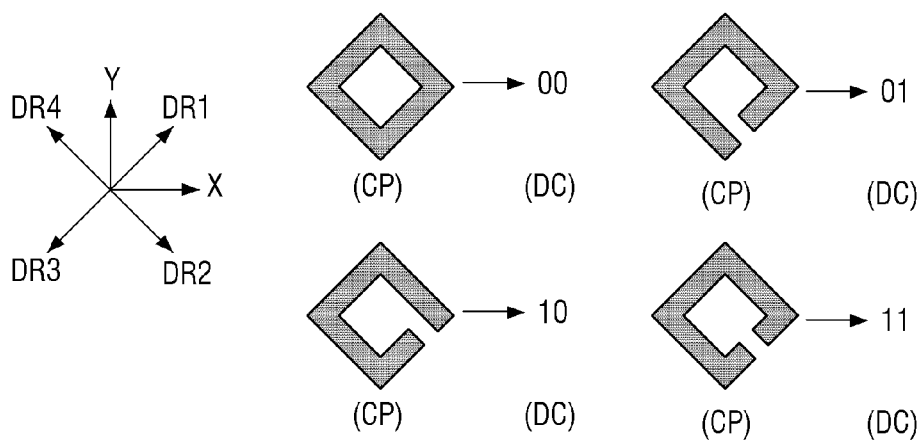

FIG. 28 is a view illustrating yet another example of a code pattern in a display device according to one or more embodiments. Moreover, FIG. 29 is a diagram illustrating data codes corresponding to the code pattern of FIG. 28.

Referring to FIGS. 28 and 29, the plurality of touch electrodes SEN may be formed in a mesh structure (e.g., in plan view). Edges of the minimum unit of the plurality of touch electrodes SEN may cross each other in the first direction DR1 and the second direction DR2. At least some touch electrodes SEN among the plurality of touch electrodes SEN may include the code pattern CDP. At least some driving electrodes TE among the plurality of driving electrodes TE, or at least some sensing electrodes RE among the plurality of sensing electrodes RE, may include the code pattern CDP.

The code pattern CDP may include the reference point RP and the plurality of code patterns CP.

The reference point RP may be an identification reference of the code pattern CDP. For example, the reference point RP may correspond to an area in which all edges forming the mesh shape are cut. The reference point RP may include first and second reference points RP1 and RP2. Each of the first and second reference points RP1 and RP2 may be located in a row and a column in which the plurality of code patterns CP are arranged. For example, when the code pattern CDP is arranged in a 4-by-3 matrix, the first reference point RP1 may be located in the first row Row1 and the first column Col1, the second reference point RP2 may be located in the third row Row3 and the first column Col1, and the plurality of code patterns CP may be arranged in the remaining rows and columns. The arrangement positions of the reference point RP and the plurality of code patterns CP are not limited thereto.

The plurality of code patterns CP may be located in a preset area based on the first and second reference points RP1 and RP2. An inclination or rotation angle of the plurality of code patterns CP with respect to the camera may be sensed by the first and second reference points RP1 and RP2.

The plurality of code patterns CP may be cut according to a corresponding criterion to have position information. The plurality of code patterns CP may correspond to a value of a preset data code DC. For example, the plurality of code patterns CP may be provided by cutting a corresponding portion of an edge forming a mesh shape. The positions at which the plurality of edges are cut may correspond to a value of a preset data code DC constituting the position information. For example, the code pattern CP located in the $m^{th}$ row and the $n^{th}$ column may correspond to the data code DC located in the $m^{th}$ row and the $n^{th}$ column.

For example, the uncut code pattern CP may correspond to the data code DC of [00]. The code pattern CP in which the lower portion of the edge extending in the first direction DR1 is cut may correspond to the data code DC of [01]. The code pattern CP in which the upper portion of the edge extending in the first direction DR1 is cut may correspond to the data code DC of [10]. The code pattern CP in which the central portion of the edge extending in the first direction DR1 is cut may correspond to the data code DC of [11].

A twenty-second code pattern located in the second row Row2 and the second column Col2 may not be cut, and a twenty-second data code may have a value of [00]. A twelfth code pattern CP12 located in the first row Row1 and the second column Col2, along with a twenty-first code pattern CP21, a thirty-third code pattern CP33, a forty-first code pattern CP41, may include an edge of which the lower portion is cut, and a twelfth data code, a twenty-first data code, a third-third data code, and a forty-first data code, may each have a value of [01]. A thirteenth code pattern CP13 located in the first row Row1 and the third column Col3, along with a forty-third code pattern CP43, may include an edge of which the upper portion is cut, and a thirteenth data code and a forty-third data code may each have a value of [10]. A twenty-third code pattern CP23 located in the second row Row2 and the third column Col3, along with a thirty-second code pattern CP32, may include an edge of which the central portion is cut, and a twenty-third data code and a thirty-second code pattern may each have a value of [11].

The data codes DC arranged in some rows may constitute a first data Data1 of the coordinate data, and the data codes DC arranged in some other rows may constitute a second data Data2 of the coordinate data. For example, the first data Data1 may correspond to the X-axis coordinates of the touch position, and the second data Data2 may correspond to the Y-axis coordinates of the touch position, but examples of the first and second data Data1 and Data2 are not limited thereto.

For example, as shown in FIG. 29, the data codes DC arranged in the first row Row1 and the second row Row2 may constitute the first data Data1 of the coordinate data, and the data codes DC arranged in the third row Row3 and the fourth row Row4 may constitute the second data Data2 of the coordinate data. Accordingly, the plurality of code patterns CP may be converted into the corresponding data codes DC, and coordinate data may be rapidly generated based on the data codes DC without complex computation and correction.

The display device 10 may receive a touch input of a touch input device, such as a smart pen by including the plurality of code patterns CP provided on at least some touch electrodes SEN among the plurality of touch electrodes SEN. The plurality of code patterns CP may be cut according to a corresponding criterion to have position information, and may correspond one-to-one to the preset data codes DC. Accordingly, the display device 10 may reduce cost, reduce power consumption, and simplify the driving process by receiving the generated coordinate data without complex computation and correction using the data code DC. In addition, the display device 10 may not be limited in size and may be applied to all electronic devices having a touch function by including the plurality of code patterns CP provided on at least some of the touch electrodes SEN.

In concluding the detailed description, those skilled in the art will appreciate that many variations and modifications can be made to the embodiments without substantially departing from the aspects of the present disclosure. Therefore, the disclosed embodiments of the present disclosure are used in a generic and descriptive sense only and not for purposes of limitation.

What is claimed is:

1. A smart pen comprising:
   a body;
   a pen tip portion at an end of the body, and comprising:
     a pen tip extending in a first direction;
     a pen tip support configured to support the pen tip; and
     a reflector on one surface of the pen tip support, and having a curvature;
   a light emitter supported by the body, configured to emit light, and inclined at an angle with respect to the first direction;
   a light-transmitting layer housed within the body, and configured to transmit light having an infrared wavelength, and to block light having wavelengths other than the infrared wavelength; and
   a light receiver configured to receive image data of distinct, respective visible code patterns physically formed by touch electrodes of a display panel, the code patterns indicating position information based on respective areas being distinguishable due to respective visible, structural differences of patterns corresponding to respective cut locations of the touch electrodes.

2. The smart pen of claim 1, wherein a radius of curvature forming the curvature is about 70 mm to about 100 mm.

3. The smart pen of claim 1, wherein the angle is within a range of about 15 degrees to about 20 degrees.

4. The smart pen of claim 1, wherein the pen tip support defines a receiving hole in which the pen tip is accommodated.

5. The smart pen of claim 4, wherein the pen tip support comprises:
   a first pen tip support surrounding a portion of a side surface of the pen tip; and
   a second pen tip support surrounding a remaining portion of the side surface of the pen tip.

6. The smart pen of claim 5, wherein the receiving hole is defined as a space between the first pen tip support and the second pen tip support.

7. The smart pen of claim 5, wherein the second pen tip support comprises:
   a first surface in contact with the pen tip; and
   a second surface opposite to the first surface, and in contact with the reflector.

8. The smart pen of claim 7, wherein the second surface of the second pen tip support has the curvature.

9. The smart pen of claim 1, wherein the body comprises:
   a first support; and
   a second support configured to support the light emitter, and fixed to the first support.

10. The smart pen of claim 9, wherein the second support comprises:
    a light emitter support portion having a first support surface supporting a surface of the light emitter, and a second support surface supporting another surface of the light emitter;
    a first fixing portion extending from a first end of the light emitter support portion in the first direction, and overlapping the first support in a second direction that is orthogonal to the first direction; and
    a second fixing portion extending in the first direction from a second end of the light emitter support portion, and overlapping the first support in the second direction.

11. The smart pen of claim 10, further comprising a light emitting circuit board between the light emitter and the second support surface, and electrically connected to the light emitter.

12. The smart pen of claim 9, wherein the light receiver is inside the first support, and is configured to receive light from the body.

13. The smart pen of claim 12, wherein the light-transmitting layer is between the pen tip support and the first support.

14. The smart pen of claim 13, wherein a distance between the light receiver and the light-transmitting layer is greater than a distance between the light emitter and the light-transmitting layer.

15. The smart pen of claim 1, wherein the light emitter is configured to emit infrared light.

16. The smart pen of claim 15, wherein the reflector contains an infrared reflective material.

17. The smart pen of claim 16, wherein the reflector is formed in a shape having the curvature.

18. A smart pen comprising:
    a body comprising a first support, and a second support connected to the first support;
    a light emitter supported by the second support, and configured to emit light;
    a pen tip portion comprising a pen tip extending in a first direction, and a pen tip support configured to support the pen tip;
    a light-transmitting layer housed within the body, and configured to transmit light having an infrared wavelength, and to block light having wavelengths other than the infrared wavelength; and
    a light receiver configured to receive image data of visible code patterns physically formed by touch electrodes of a display panel, the code patterns indicating position information due to visible, structural differences of patterns corresponding to respective cut locations of the touch electrodes,
    wherein the second support comprises:
      a light emitter support portion having a first support surface supporting a first surface of the light emitter, and a second support surface supporting a second surface of the light emitter;
      a first fixing portion extending from a first end of the light emitter support portion in the first direction, and overlapping the first support in a second direction that is orthogonal to the first direction; and
      a second fixing portion extending in the first direction from a second end of the light emitter support portion, and overlapping the first support in the second direction.

19. The smart pen of claim 18, wherein the second support surface is inclined at an angle with respect to the first direction.

20. The smart pen of claim 19, wherein the angle is within a range of about 15 degrees to about 20 degrees.

* * * * *